(12) United States Patent
Volk et al.

(10) Patent No.: US 12,270,186 B1
(45) Date of Patent: Apr. 8, 2025

(54) WELL WATER SYSTEM

(71) Applicant: Franklin Electric Co., Inc., Fort Wayne, IN (US)

(72) Inventors: James J. Volk, Fort Wayne, IN (US); Zachary K. Foster, Spencerville, IN (US)

(73) Assignee: Franklin Electric Co., Inc., Fort Wayne, IN (US)

( * ) Notice: Subject to any disclaimer, the term of this patent is extended or adjusted under 35 U.S.C. 154(b) by 257 days.

(21) Appl. No.: 17/709,138

(22) Filed: Mar. 30, 2022

Related U.S. Application Data

(60) Provisional application No. 63/168,736, filed on Mar. 31, 2021.

(51) Int. Cl.
*E03B 5/04* (2006.01)
*G01L 19/08* (2006.01)
*G01M 3/04* (2006.01)

(52) U.S. Cl.
CPC ............ *E03B 5/045* (2013.01); *G01L 19/083* (2013.01); *G01M 3/04* (2013.01)

(58) Field of Classification Search
CPC ......... E03B 5/045; G01L 19/083; G01M 3/04
See application file for complete search history.

(56) References Cited

U.S. PATENT DOCUMENTS

| | | | | |
|---|---|---|---|---|
| 4,478,765 A | * | 10/1984 | Tubbs | B01F 23/23 138/44 |
| 5,147,530 A | * | 9/1992 | Chandler | E21B 43/121 210/197 |
| 10,090,878 B2 | | 10/2018 | Emshwiller et al. | |
| 2020/0131744 A1 | * | 4/2020 | Hunt | E03B 7/075 |

* cited by examiner

*Primary Examiner* — David Z Huang
(74) *Attorney, Agent, or Firm* — Faegre Drinker Biddle & Reath LLP

(57) ABSTRACT

A self-contained well water system is designed to be interposed between an external well pump and a plumbing system of a building. The system requires an installer or building owner to make only three basic connections for fully-functional operation: a single water inlet connection from the well pump to the well water system, a single water outlet connection from the well water system to a main input line of the building plumbing system, and a single power connection to provide electrical power to the electrical components of the system, and may also distribute power out to the well pump. The remaining components and the connections therebetween are configured and factory-assembled for maximum performance and efficiency.

16 Claims, 23 Drawing Sheets

WELL WATER SYSTEM

CROSS REFERENCE TO RELATED APPLICATION

This application claims the benefit of U.S. Provisional Application No. 63/168,736 filed on Mar. 31, 2021 and entitled WELL WATER SYSTEM, the entire disclosure of which is hereby expressly incorporated herein by reference.

FIELD OF THE DISCLOSURE

The present disclosure relates generally to a well water pump and pressure system and, more particularly, to a self-contained pressure system designed to interface with a well pump.

BACKGROUND OF THE DISCLOSURE

Well water is pumped out of the ground automatically using a submersible pump that is submerged toward the bottom of a well and pushes water up through the well to create water pressure for the user. Less commonly, a jet pump is used that sits on top of the ground and draws water out of the ground.

Well water systems may use a pressure tank which stores a quantity of water under pressure. Upon demand, the pressure within the tank can direct the water to a point of use, such as a faucet or bath fixture. When the pressure drops below a lower threshold (e.g., 30 psi) as measured by a pressure switch, the pump may be activated to replenish water and pressure to the tank until an upper threshold (e.g., 50 psi) is reached. In this way, the end user may receive a continuous supply of relatively-constant pressure water flow without constant operation of the pump.

For example, FIG. 1 shows an example of a predicate well water pressure system 10. System 10 includes a pressure tank 12, a controller 14 (e.g., for a variable frequency drive to operate a variable speed submersible motor) and an arrangement of components 16 may include pressure switches or transducers, a pressure gauge, on/off valves, and various connections and auxiliary components. System 10 is a typical "site built" arrangement in which all the components must be arranged, mounted and connected according to the knowledge of the installer, the spatial constraints of the space used for the installation, and various additional factors.

SUMMARY OF THE DISCLOSURE

The present disclosure provides a self-contained well water system which is designed to be interposed between a well pump and a plumbing system of a building. The system requires an installer or building owner to make only three basic connections for fully-functional operation: a single water inlet connection from the well pump to the well water system, a single water outlet connection from the well water system to a main input line of the building plumbing system, and a single power connection to provide electrical power to the electrical components of the system, and may also distribute power out to the well pump. The remaining components and the connections therebetween are configured and factory-assembled for maximum performance and efficiency.

In one form thereof, the present disclosure provides a well water system including a housing, a water inlet mounted to the housing, a water outlet mounted to the housing, an electrical junction box mounted to the housing, the junction box including a set of power wires configured to receive electrical power from a power source and a set of pump wires configured to send power to a well pump external of the housing, a pressure tank contained within the housing, a manifold contained within the housing and having a manifold inlet connected to the water inlet, a manifold outlet connected to the water outlet, and a pressure tank aperture connected to the pressure tank, and a control circuit operably connected to the junction box, the control circuit electrically connected to the set of power wires and to the set of pump wires.

In another form thereof, the present disclosure provides a method of installing a well water system contained in a housing, the method including creating a fluid-tight inlet connection from a well water supply line to a water inlet of the well water system, the water inlet supported by the housing, creating a fluid-tight outlet connection from a water outlet of the well water system to a plumbing input, the water outlet supported by the housing, creating an electrical connection from a power supply to a set of power wires supported by the housing of the well water system, and creating a pump power connection between a well pump external of the housing and a set of pump wires supported by the housing of the well water system.

In yet another form thereof, the present disclosure provides a method of producing a self-contained well water system, the method including retrieving a housing, a pressure tank, a manifold, an inlet and an outlet from a warehoused stock of components, installing the pressure tank within the housing, installing the manifold to the pressure tank and within the housing, with a fluid-tight connection between the pressure tank and the manifold, installing the inlet to the housing, with a fluid-tight connection between the pressure tank and the inlet, and installing the outlet to the housing, with a fluid-tight connection between the pressure tank and the outlet.

The above-mentioned and other features of the invention and the manner of obtaining them will become more apparent and the invention itself will be better understood by reference to the following description of exemplary embodiments of the invention taken in conjunction with the accompanying drawings.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
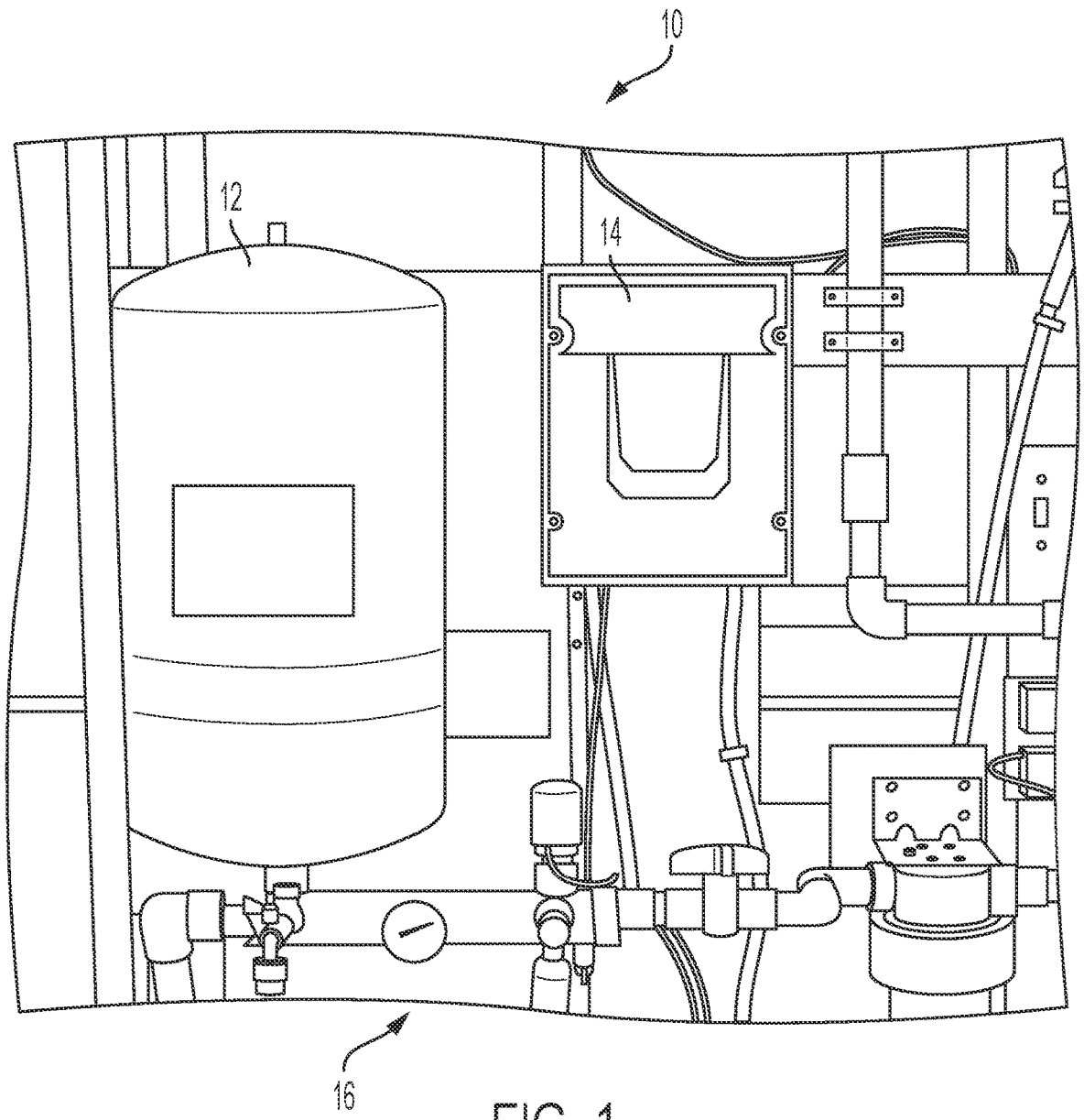
FIG. 1 is a perspective view of a site-built well water system according to the prior art.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 2:
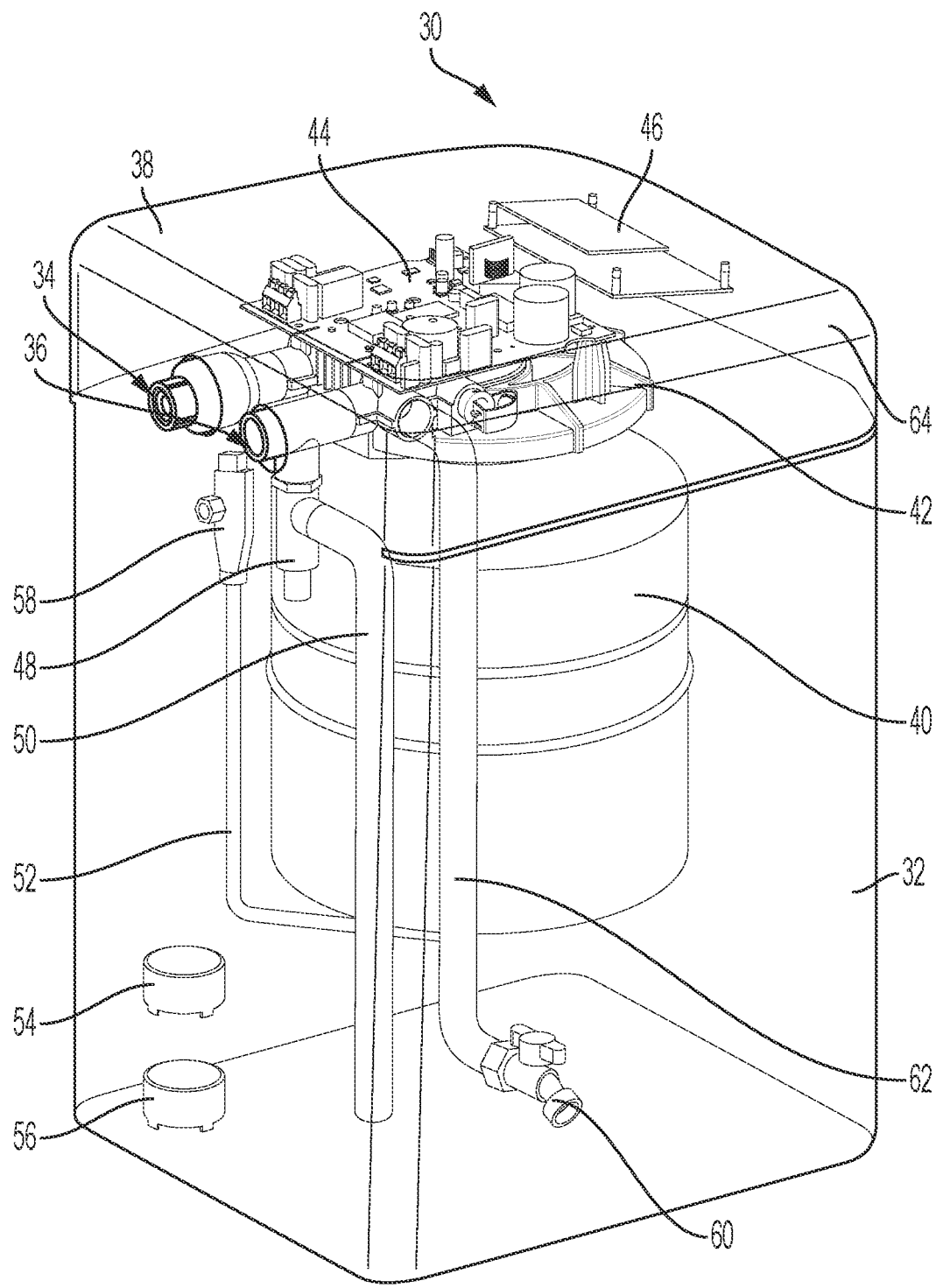
FIG. 2 is a perspective view of a self-contained well water system made in accordance with the present disclosure.
Figure 3:
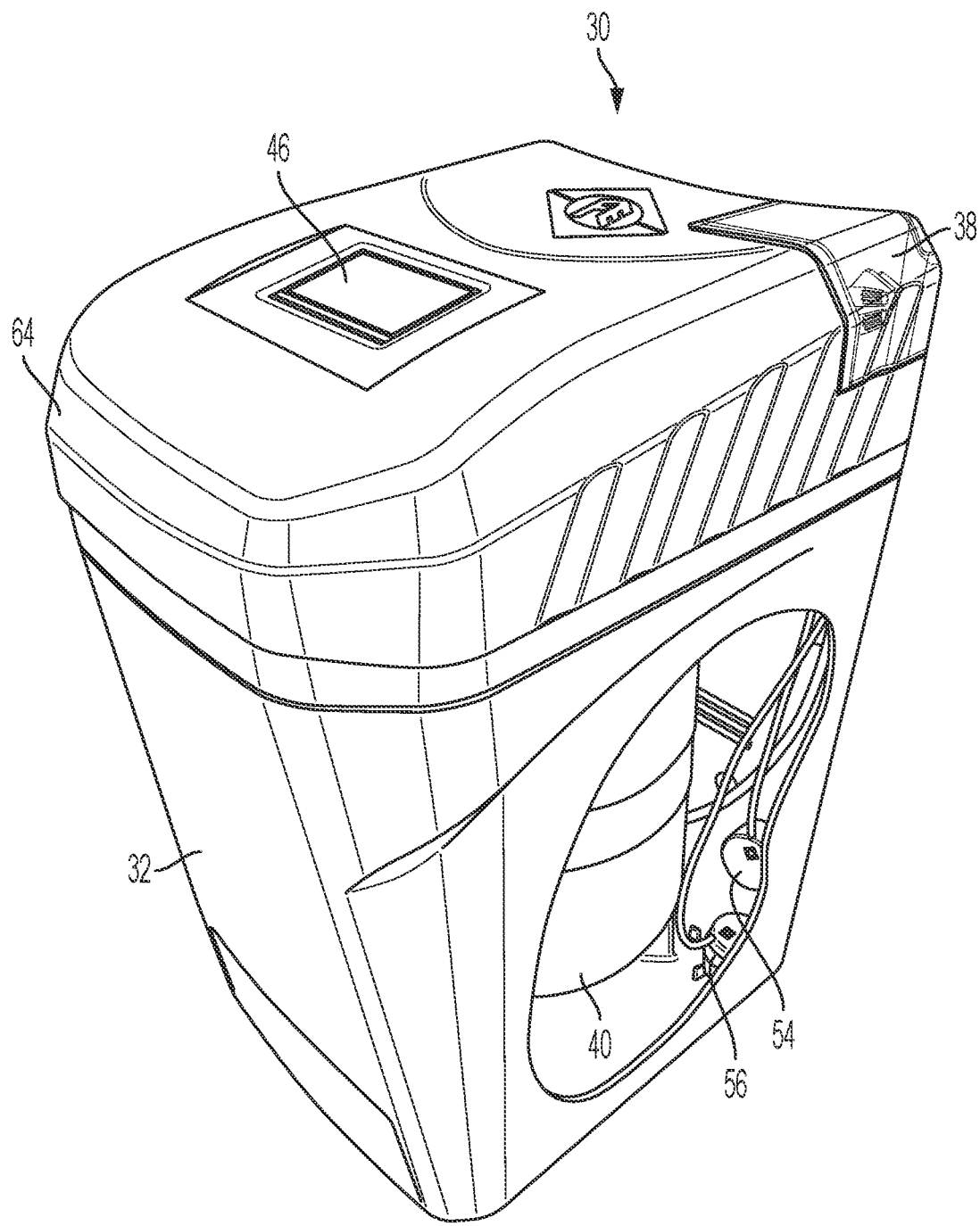
FIG. 3 is another perspective view of the self-contained well water system of FIG. 2, with a cutout in its housing to illustrate internal components.

Referring now to FIG. 2, well water delivery system 30 is shown with a translucent housing 32 to illustrate internal components. System 30 is a self-contained system which includes all the connections and components needed to connect a well water supply line to a plumbing system, with such connections and components supported by and contained within a housing 32. As described in further detail below, system 30 can be deployed as a "turn-key" solution for distributing water flowing from a well pump to the end-use fixtures of a house or business, without the need to build a well delivery system from individual plumbing components.

For purposes of the present disclosure, a "well pump" is any pump which is designed to draw water from a well and deliver the water to the plumbing system of the building. Exemplary well pumps include submersible well pumps, commonly used in deep wells (e.g., 30 feet or more below grade). Other well pumps may include centrifugal pumps used to deliver water stored in a cistern to the plumbing system, where the cistern is filled separately from a well. Yet another example includes fire-protected systems which may use a turbine pump to retrieve water for fire protection systems. Generally speaking, well pumps are external to water delivery system 30 and not contained within housing 32. The well pump may be pre-existing, in the case of a retrofit of water delivery system 30 to replace a site-built system, or may be newly installed and connected to water delivery system 30.

Figure 8:
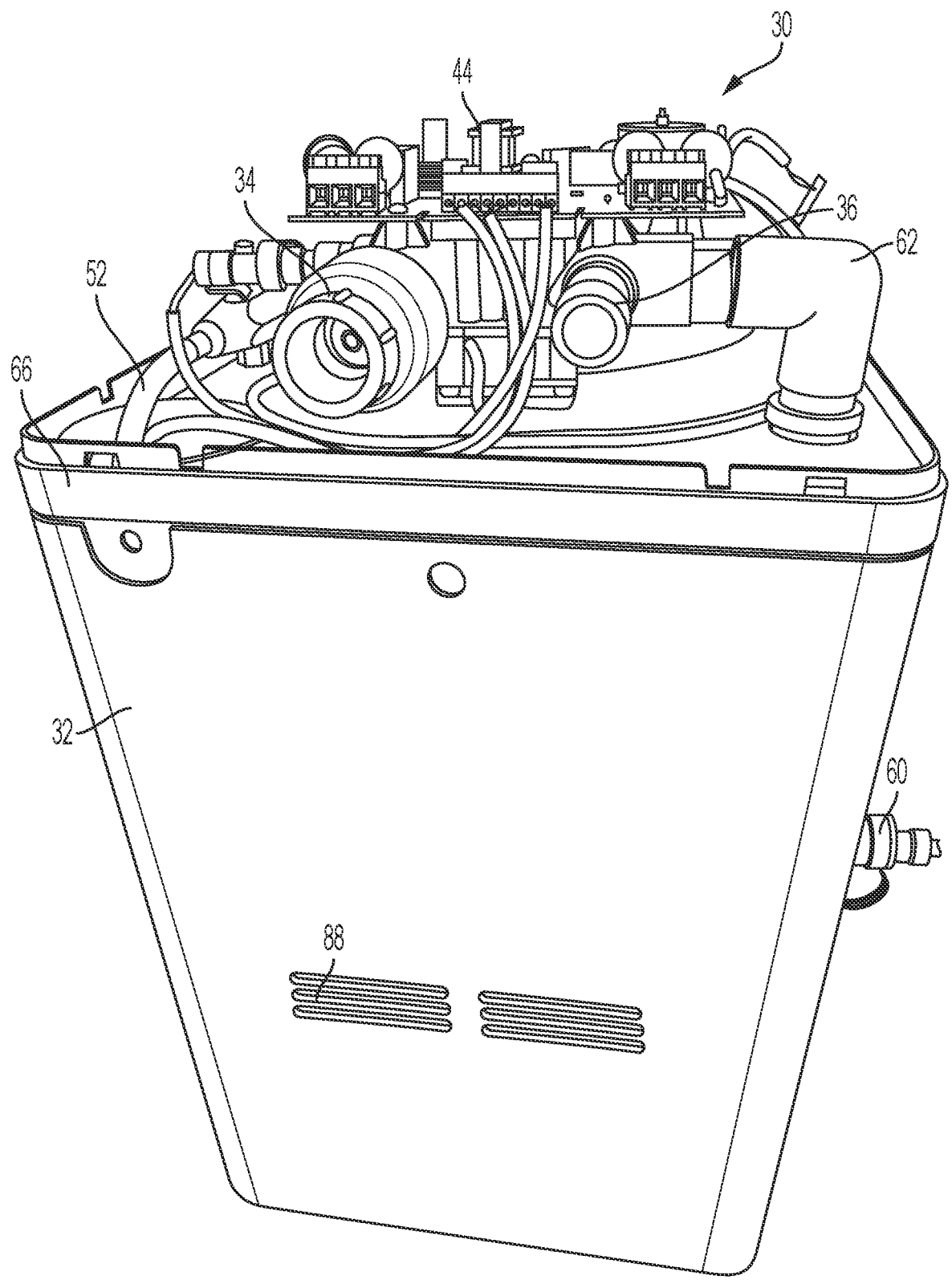
FIG. 8 is left-side perspective view of the self-contained well water system of FIG. 6.
Figure 17:
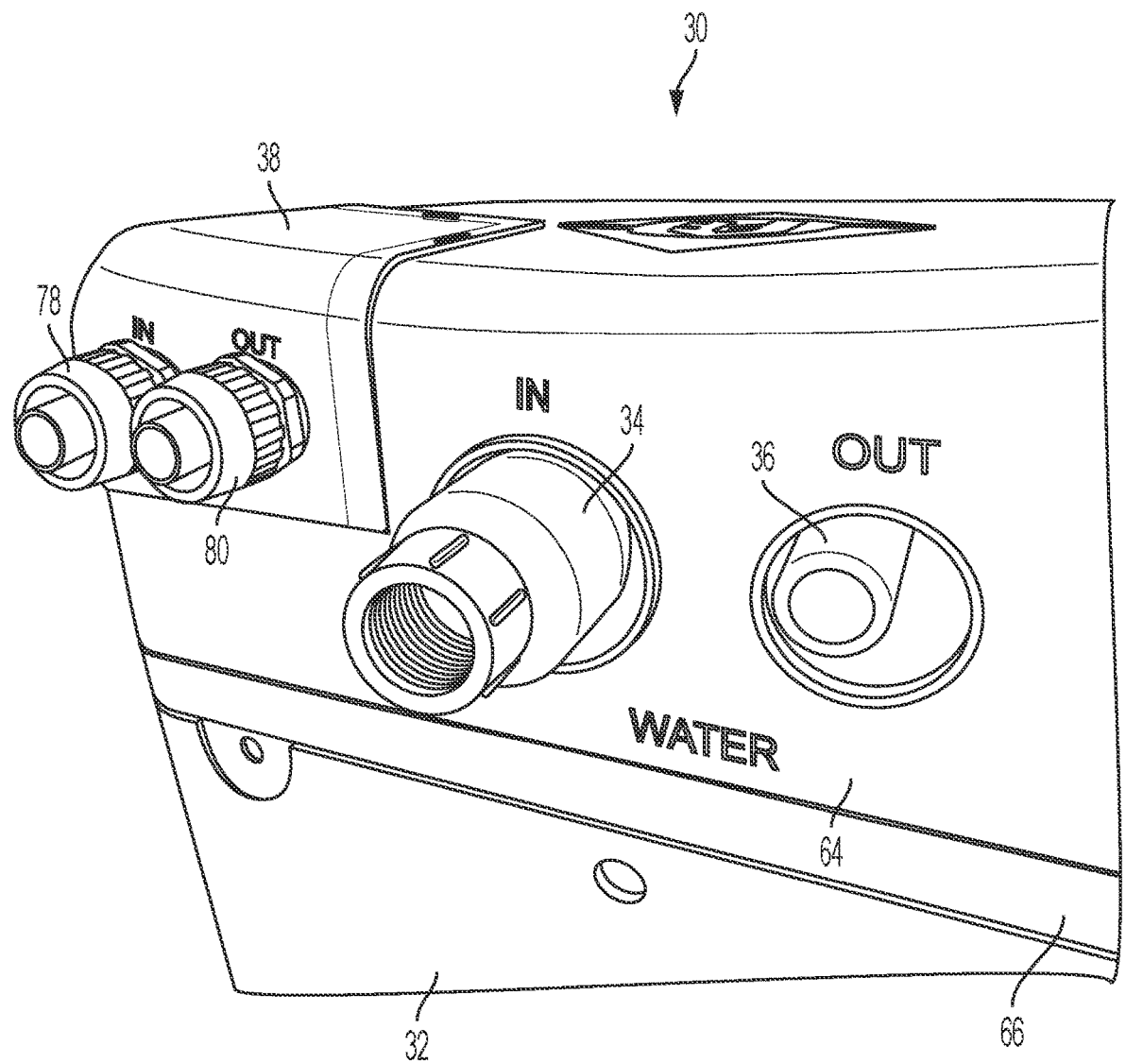
FIG. 17 is an enlarged perspective view of fluid and power connections of the system of FIG. 1.

Water delivery system 30 includes a pressure tank 40 contained within housing 32, and a manifold 42 mounted atop pressure tank 40. Control circuit 44 is mounted on the upper side of manifold 42, such that heat generated by control circuit 44 may be dispersed to the water flowing through manifold 42 as described below. Manifold 42 is configured to receive a pressurized flow of water from a well pump via inlet 34, and to distribute this pressurized flow to pressure tank 40 and/or outlet 36 depending on the pressure of the incoming flow and the pressure within tank 40. Inlet 34 and outlet 36 are each mounted to housing 32 via manifold 42, and are configured to be joined to their respective water lines through apertures formed in housing lid as shown in FIG. 17. In an exemplary embodiment, inlet 34 and outlet 36 are designed as standard plumbing connections configured for easy connection to their respective well-supply and building plumbing lines. In the illustrative embodiment of FIGS. 6, 8 and 10, inlet 34 may further include a check valve connected thereto.

Figure 15:
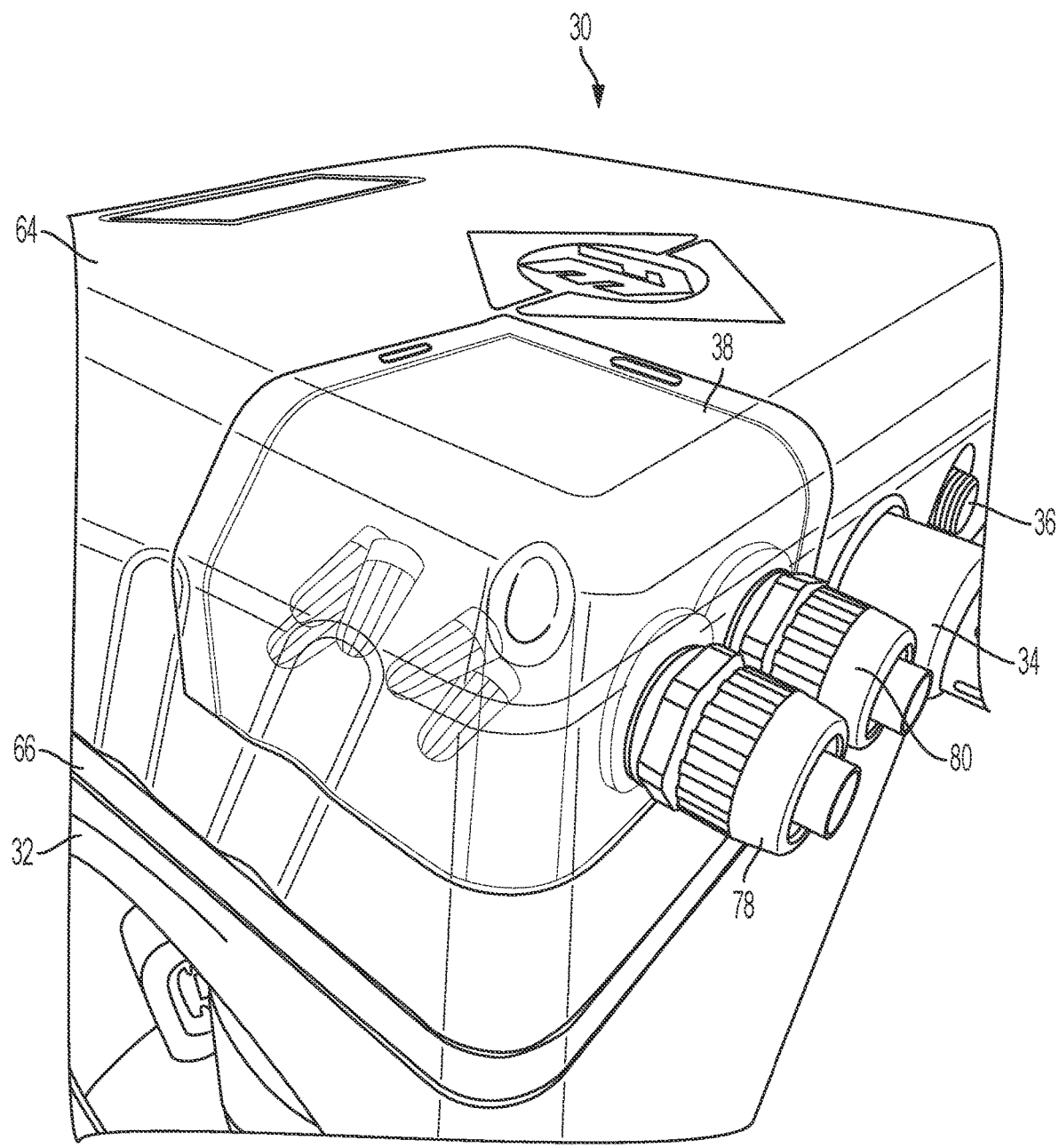
FIG. 15 is an enlarged perspective view of an electrical junction box of the system of FIG. 1.
Figure 16:
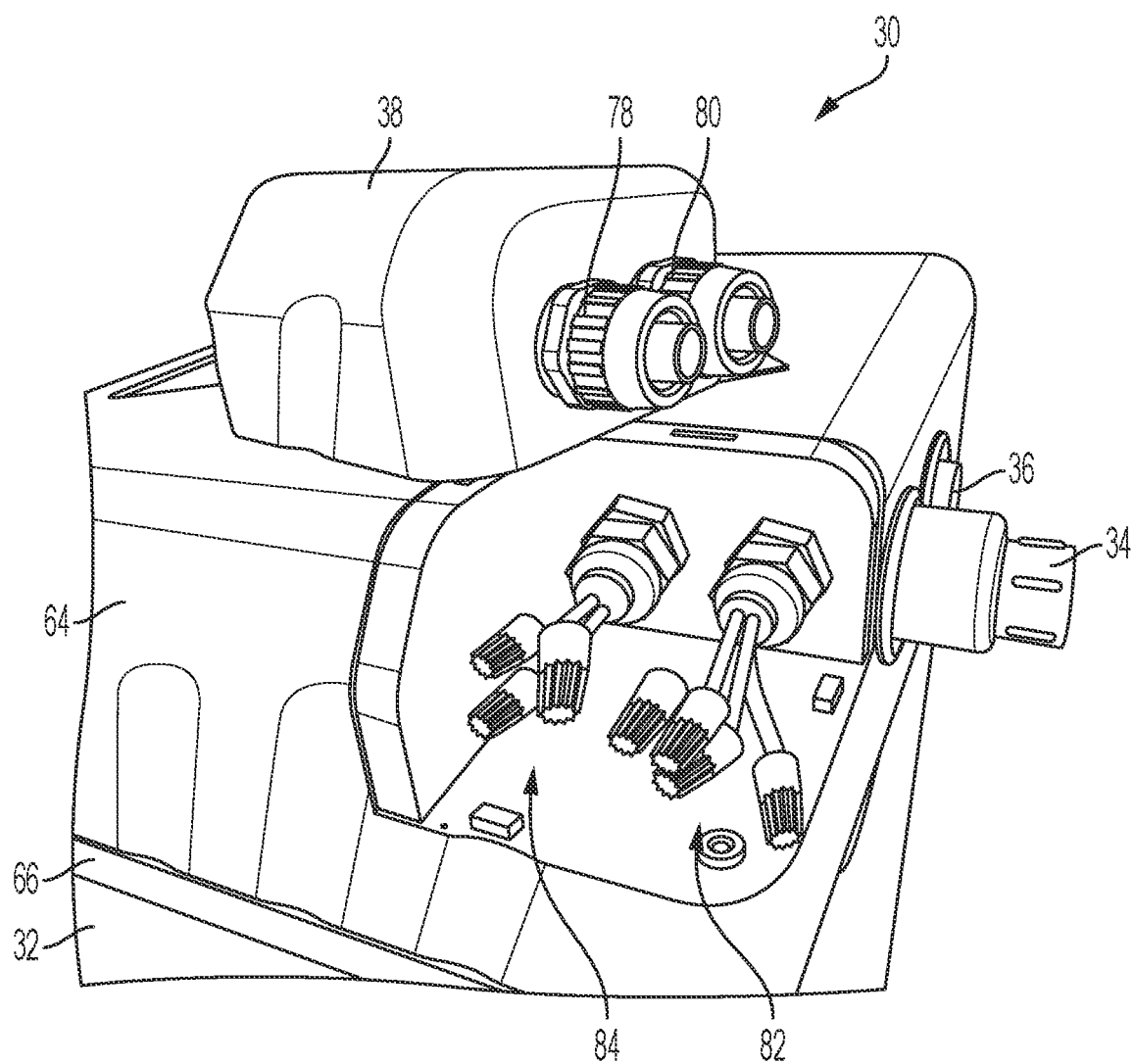
FIG. 16 is another perspective view of the electrical junction box of FIG. 15, shown with the cover removed to illustrate internal components.

Housing 32 further includes a built-in junction box recessed into lid 64 and covered by junction box cover 38, as shown in FIG. 15. As best seen in FIG. 16, the junction box contains a bundle of pump wires 82, configured to send electrical power to the well pump, and a bundle of power wires 84, configured to receive incoming electrical power from a power source (e.g., grid power, such as 110V or 220V AC power commonly available in the U.S.). Wires 82, 84 are all protected under cover 38 (FIG. 15) during normal operation of system 30, but are easily accessible by removal of cover 38 in order to install or service electrical connections. As shown in FIG. 16, wires 82, 84 are protected from the inside of housing 32 by portions of the lid 64 to avoid any moisture contact. Cover 38 further includes a pump wire junction 78 and a power wire junction 80 designed to couple with standard conduit to ensure a water-tight interface between the water delivery system 30 and the external power connection, such as the incoming power wires and well pump wires.

In an alternative embodiment, wire junctions 78 and 80 may be made through housing 32 rather than in lid 64. For example, a pair of conduit fittings may be fixed to a wall of housing 32, such as at a back wall, and wires 82, 84 may be passed through the respective conduit fittings (such as via an external conduit coupled to the fitting). Inside housing 32, a terminal block may be provided at an appropriate location. For example, a screw-in terminal may be provided to receive each of wires 82, 84 in a junction box positioned internal of the housing 32, such that the electrical connections at the terminal block are protected from moisture. In this alternative configuration, lid 64 may be removed without affecting wire junctions 78, 80.

Figure 6:
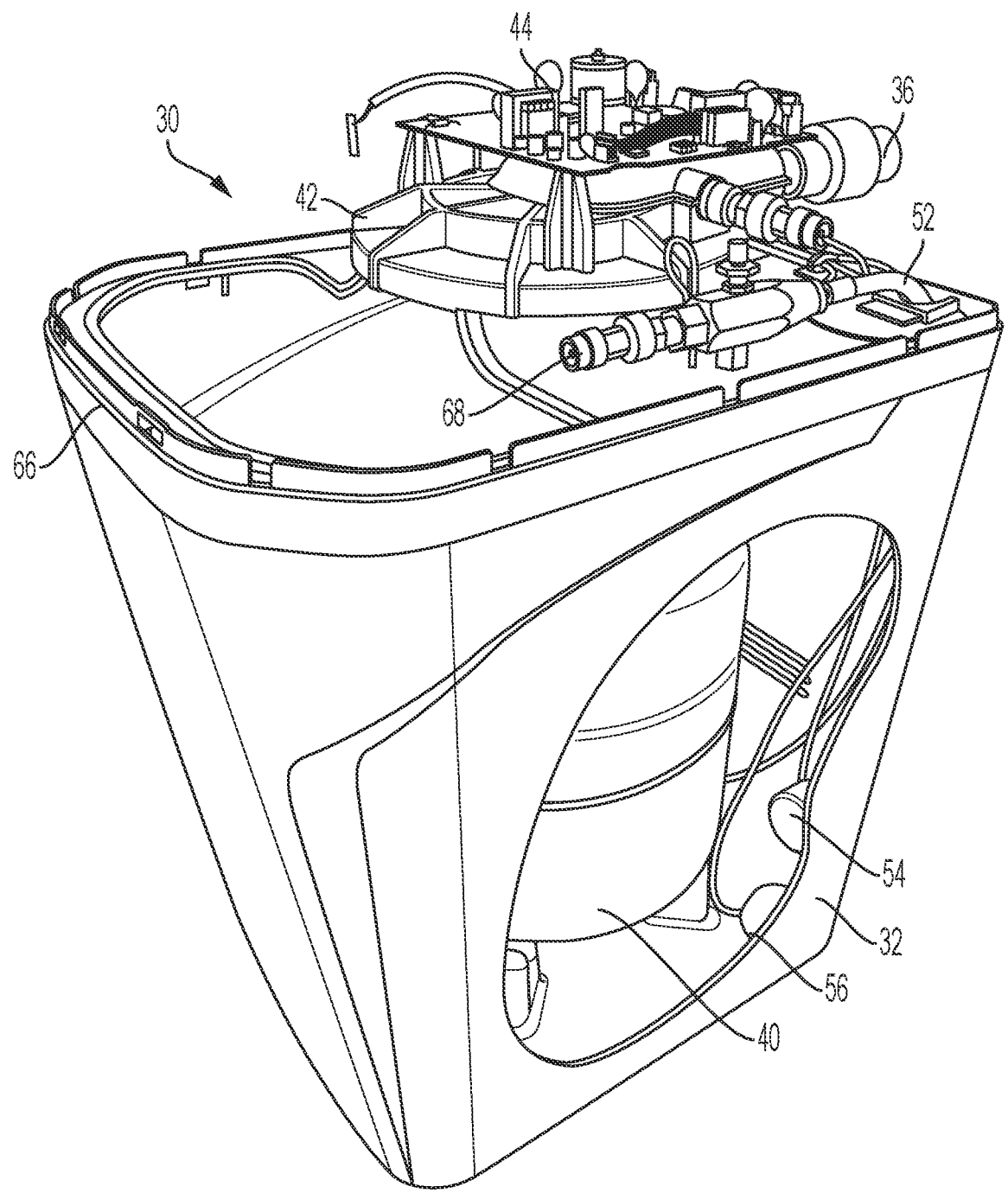
FIG. 6 is another perspective view of the self-contained well water system of FIG. 3, illustrated with the lid removed to show internal components.
Figure 7:
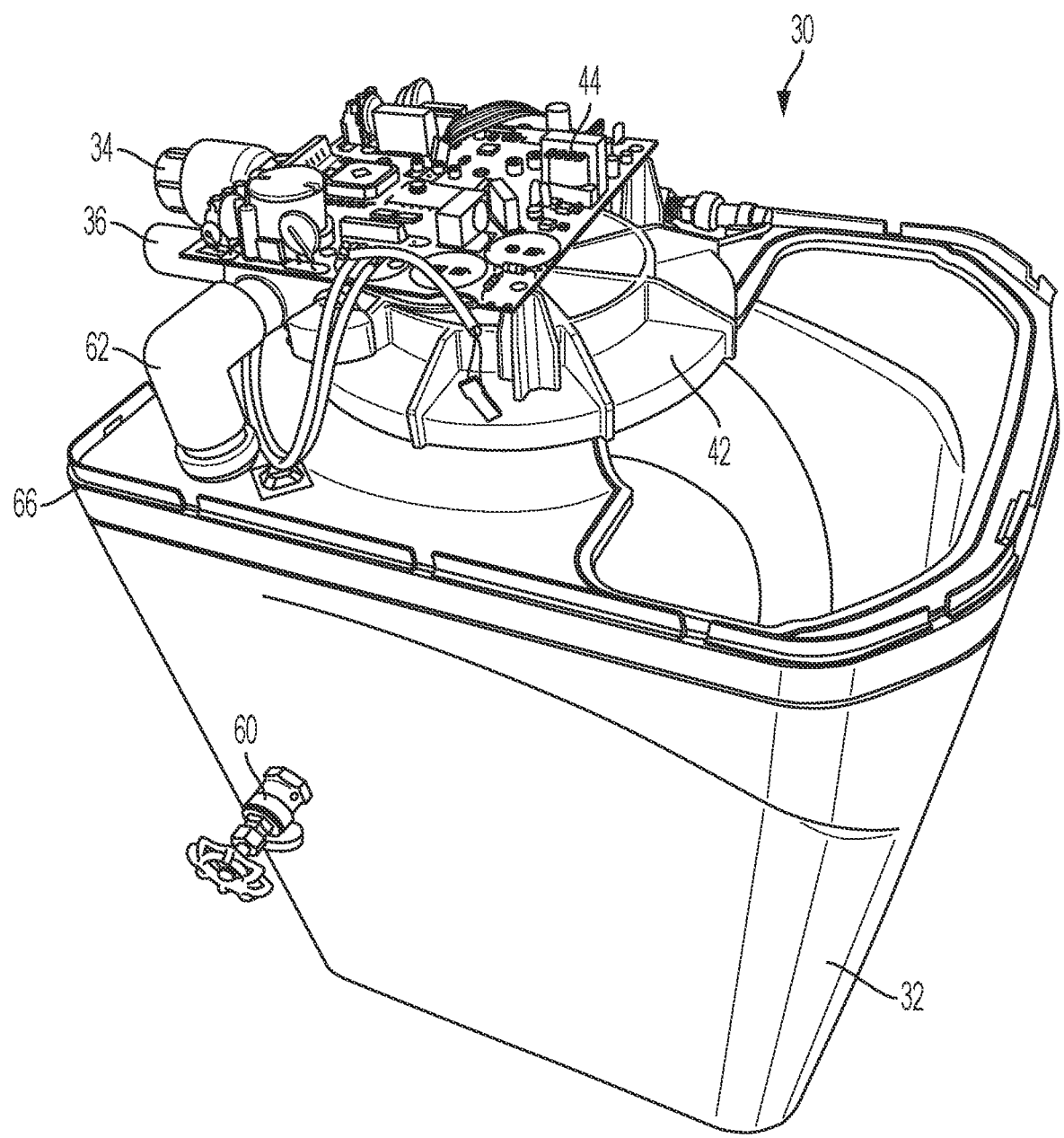
FIG. 7 is a rear perspective view of the self-contained well water system of FIG. 6.
Figure 9:
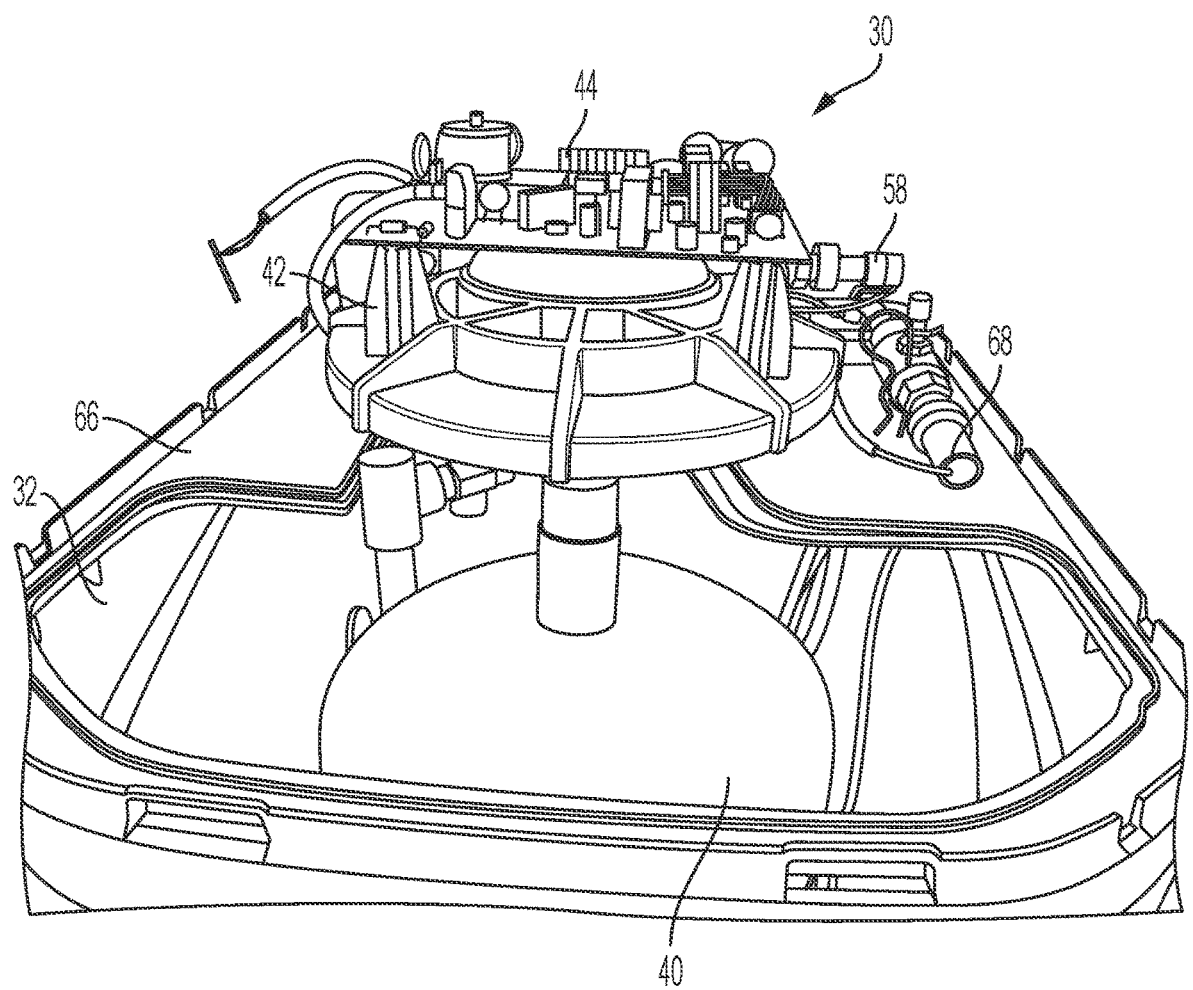
FIG. 9 is a partial, right-side perspective view of the self-contained well water system of FIG. 6.
Figure 10:
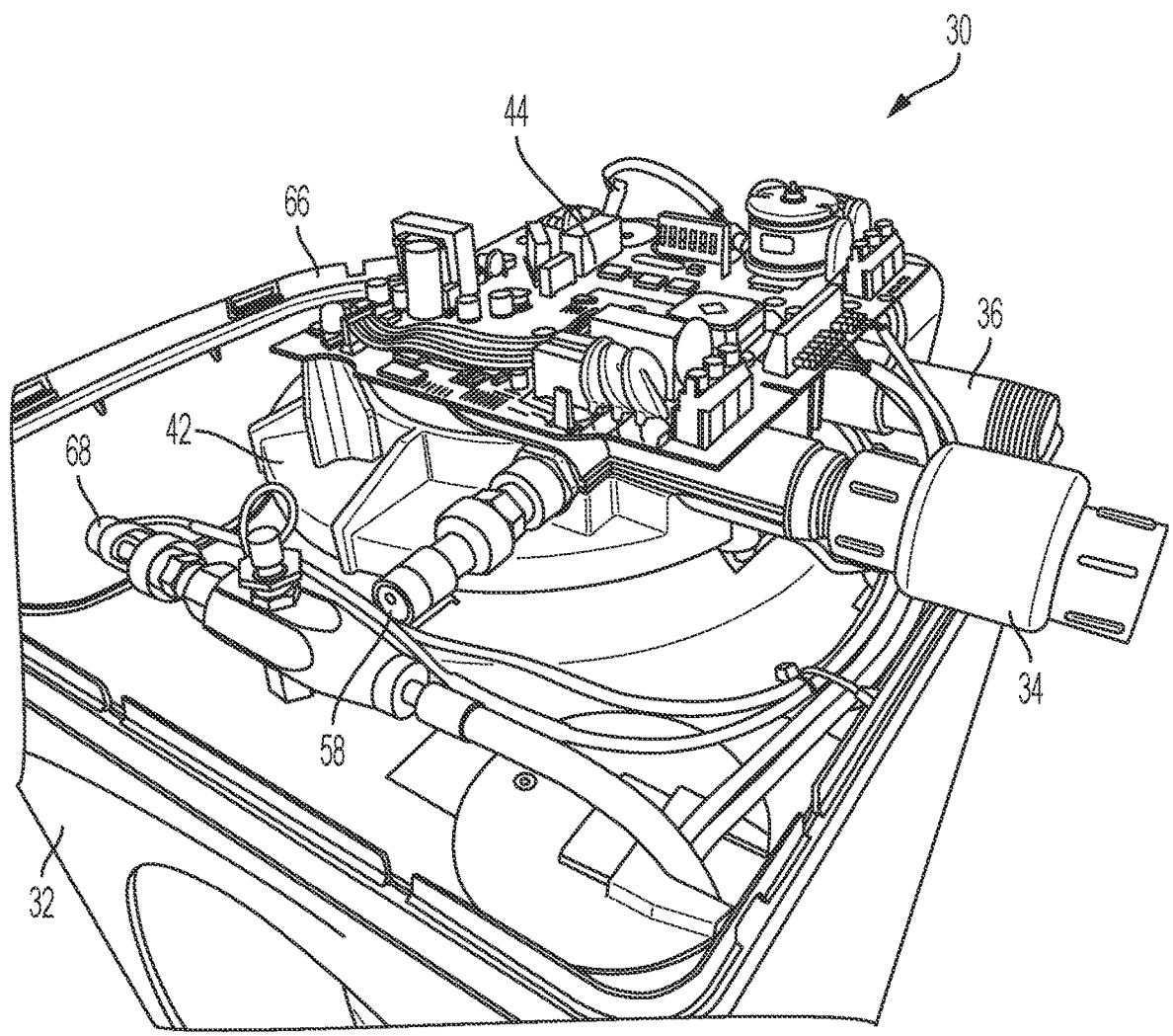
FIG. 10 is another perspective view of the self-contained well water system of FIG. 9.

Water delivery system 30 further includes a tank pressure sensor 68, such as a pressure transducer, shown in FIGS. 6, 9 and 10 connected to pressure tank 40 via a pressure conduit and to control circuit 44 via an electrical connection. In the illustrated embodiment, pressure tank 40 is an air-bladder type tank in which the bladder is allowed to expand when air pressure increases (or water pressure decreases), and contracts when air pressure decreases (or water pressure increases). Tank pressure sensor 68 is connected to the air-containment end of tank 40, illustratively disposed at the bottom portion of tank 40, by an air conduit 52 (FIGS. 2 and 6). Sensor 68 receives pressurized air and issues a signal to control circuit 44 indicative of the air pressure within pressure tank 40.

Control circuit 44 is programmed or configured to activate the well pump when pressure as indicated by sensor 68 falls below a low-pressure threshold, indicating that the water demand has depleted the water in tank 40. Water then flows to inlet 34. At least a portion of the flow from inlet 34 enters the manifold flow path via manifold inlet 35 (FIGS. 11 and 12) and is diverted into the upper, water-containment end of tank 40 via a pressure tank aperture 41 formed in the flow path and shown in the cutaway view of manifold 42 of FIG. 14. Some portion of the water may also flow to outlet 36 via manifold outlet 37, and on to the end-use delivery point (e.g., via building plumbing).

When the pressure increases to a high-pressure threshold, control circuit 44 deactivates the well pump and halts further flow to inlet 34. Water may continue to flow through outlet 36 to draw the pressure within tank 40 down until the low-pressure threshold is again reached, causing control circuit 44 to activate the well pump again and triggering a new fill/pressurize cycle.

Figure 4:
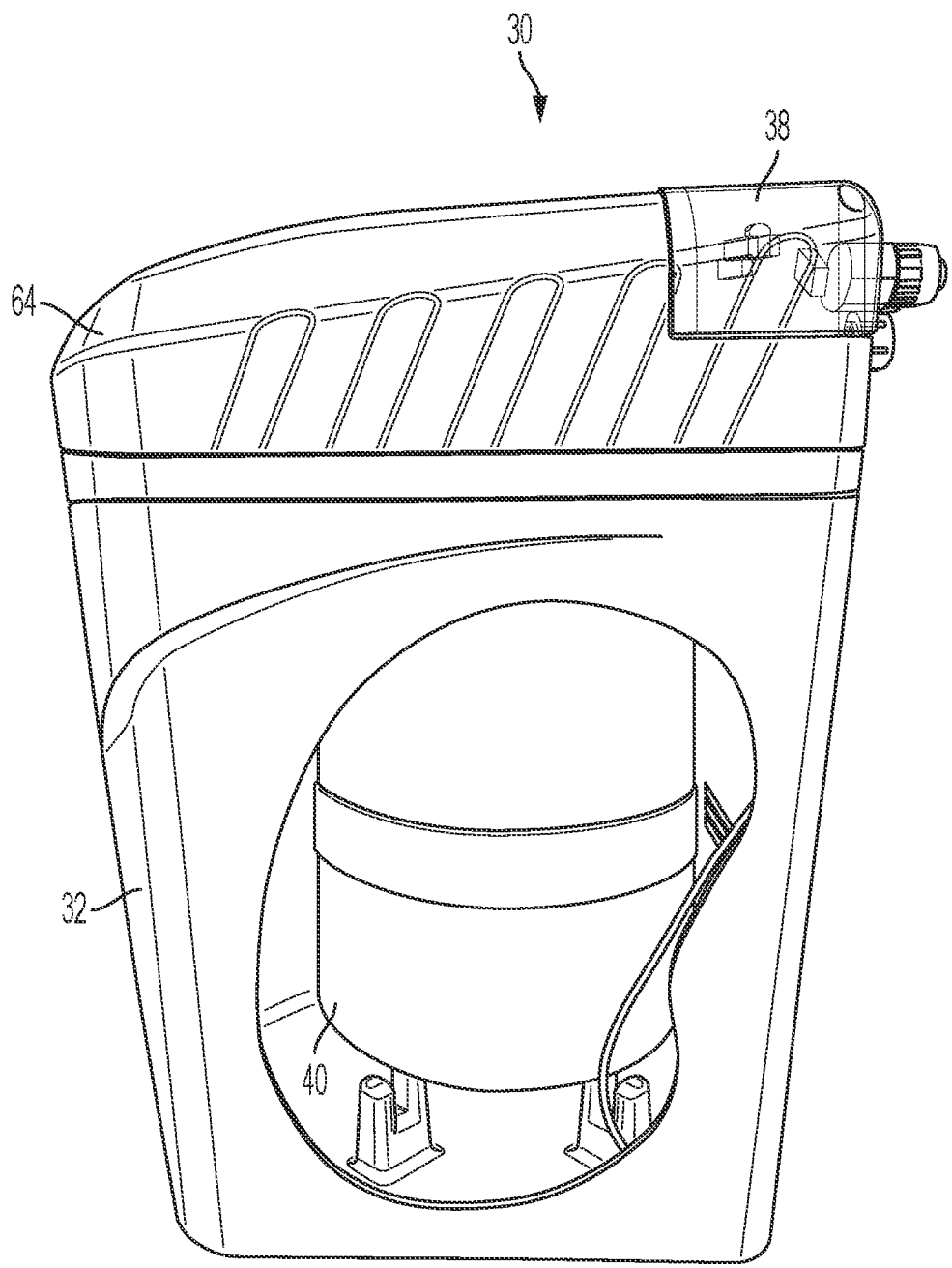
FIG. 4 is a front perspective view of the self-contained well water system of FIG. 3.
Figure 19:
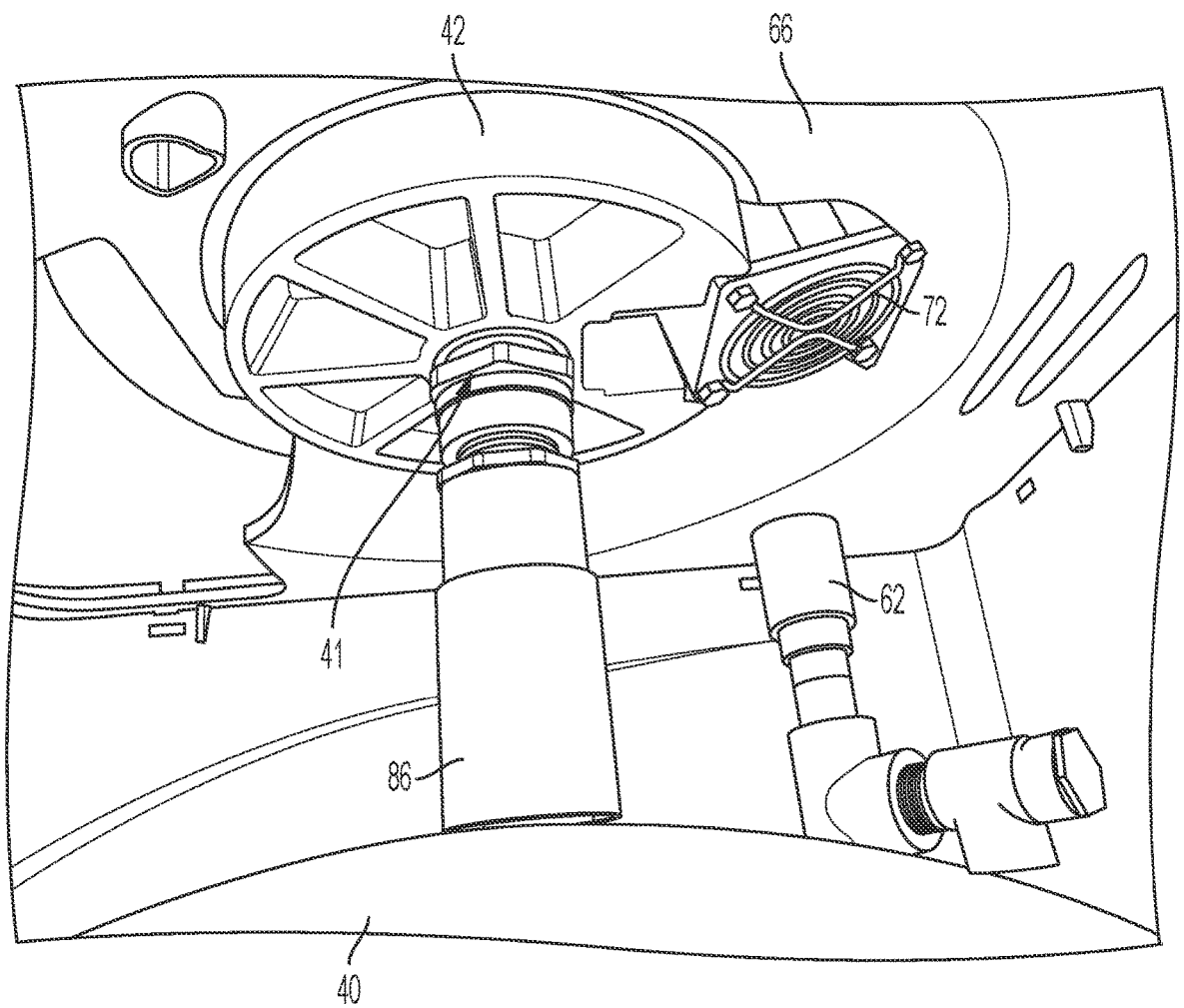
FIG. 19 is another perspective view of an internal portion of the system of FIG. 1, illustrating a connection between a pressure tank and a manifold.
Figure 20:
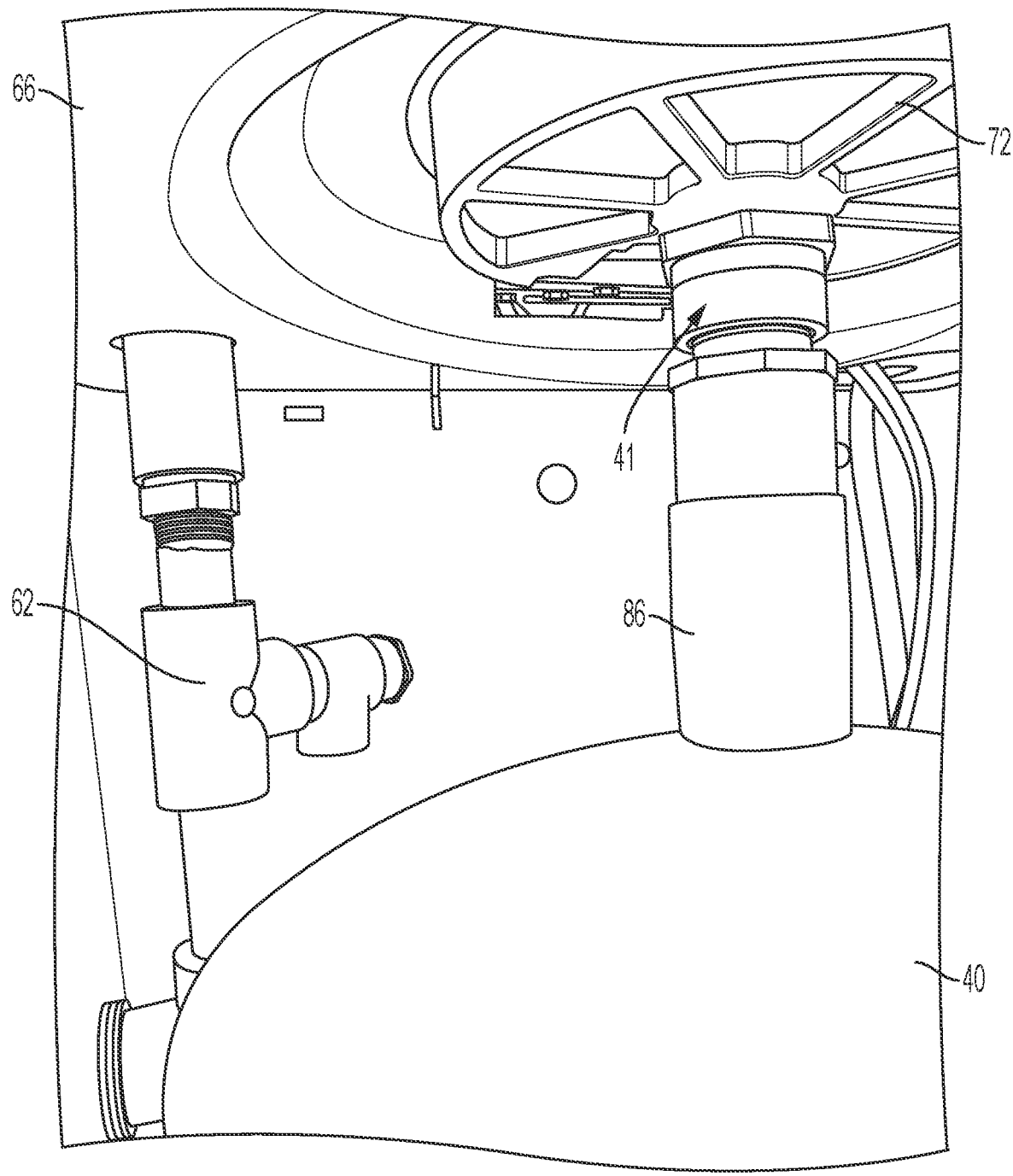
FIG. 20 is another perspective view of the internal portion shown in FIG. 19, illustrating a connection from the manifold to an auxiliary outlet.

System 30 having manifold 42, pressure tank 40, pressure sensor 68 and control circuit 44 forms a self-contained, fully functional well-water delivery system. All system components may be selected and all plumbing connections may be made in a factory setting to ensure quality and compatibility of components and high-quality junctions with lasting fluid-tight characteristics. In addition to the junctions described above, system 30 may include a factory-installed junction between tank 40 and manifold 42, as best seen in FIGS. 19 and 20. The lower, air-containment end of pressure tank 40 is firmly supported by a lower end of housing 32, such as by stanchions molded into the housing base (FIG. 4). Tank 40 may be fixed in place in this supported position to as to be immovable. The upper, water-containment end of tank 40 has a fluid-tight coupling to a lower end of pressure tank conduit 86, which extends upwardly to a second fluid-tight coupling with pressure tank aperture 41 of manifold 42 as shown in FIGS. 19 and 20. However, the weight of manifold 42 and its associated components is fully supported by housing lid support 66, which in turn is supported by housing 32. This ensures that the fluid-tight couplings between tank 40 and manifold 42 are not weight-bearing and therefore not subject to compromise as system 30 is moved or jostled. Optionally, conduit 86 may include additional structures, such as an elbow-shaped flow diverter, to mitigate the downstream effects of pressure pulses from the well pump and/or the on/off cycles of end-use plumbing fixtures.

In addition to the basic self-contained well water delivery described above, system 30 includes additional details for enhanced performance, functionality and user convenience.

Manifold 42 is shown in detail in FIGS. 11-14. As noted above and best seen in FIG. 14, the flow channel from manifold inlet 35 to manifold outlet 37 has an arcuate shape such that manifold inlet 35 defines an inlet axis that is substantially parallel to, but spaced laterally from, the outlet axis defined by manifold outlet 37. Water is allowed to smoothly flow through the channel via the arcuate bends, while also allowing the connections for inlet 34 and outlet 36 to be made on a single side of system 30. As best seen in FIG. 17, electrical junctions 78, 80 are also on the side of system 30 with the plumbing connections at 34 and 36. This configuration facilitates the installation of system 30 by only requiring the installer to have easy access to one side of housing 32, which may be particularly advantageous in confined installation spaces sometimes found in utility rooms or areas.

Figure 14:
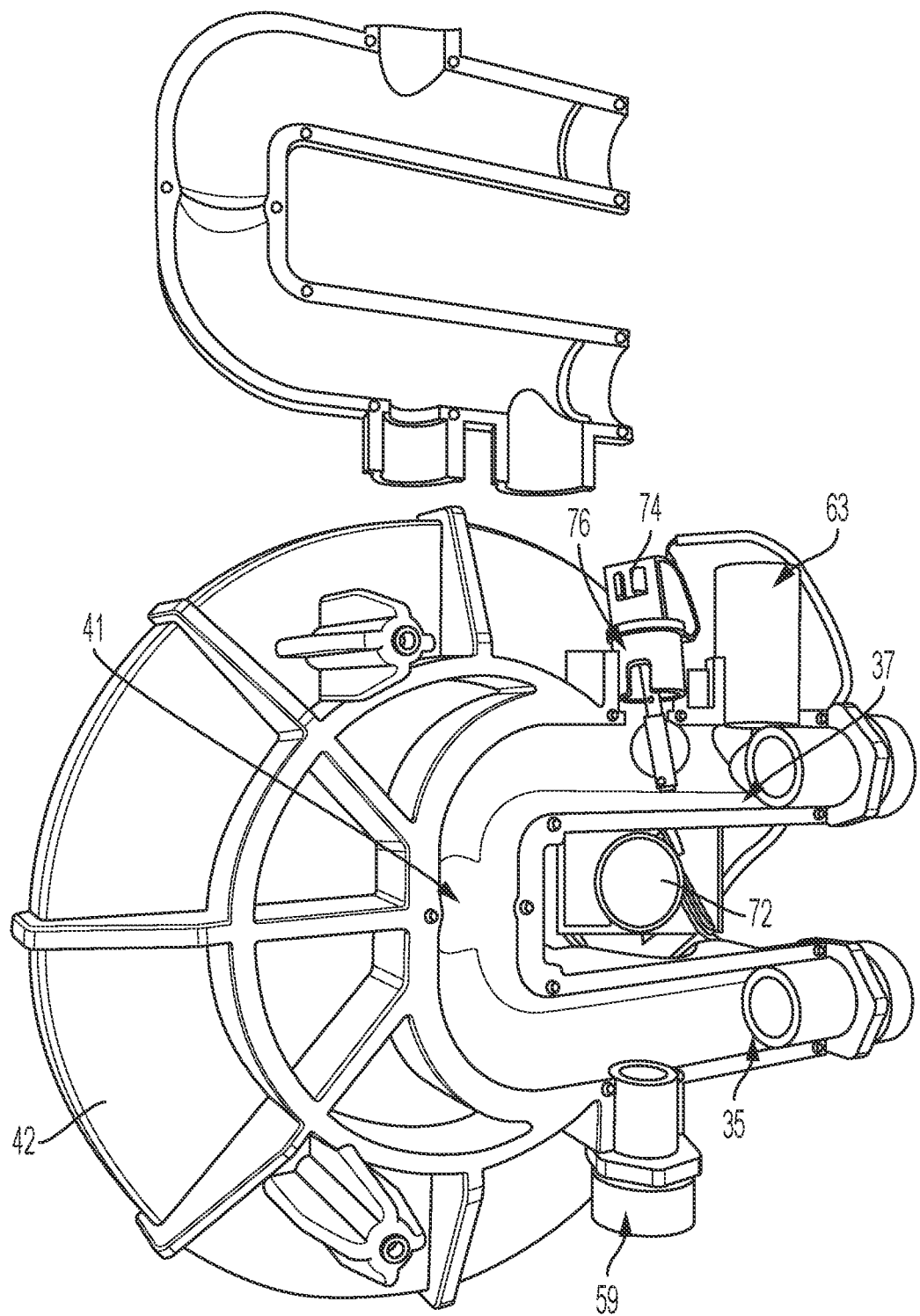
FIG. 14 is another rear perspective view of the manifold shown in FIG. 11, shown with a top section removed to illustrate connectors and attached components.

As noted above, pressure tank aperture 41 is adjacent to, and in fluid communication with, the arcuate flow channel between inlet 35 and outlet 37. This aperture 41 defines a longitudinal aperture axis substantially perpendicular to the inlet and outlet axes, as best seen in FIG. 14. This allows fluid to enter tank 40 from manifold 42 during fill and pressurization, and to exit tank 40 as tank 40 discharges water and depressurizes.

Figure 11:
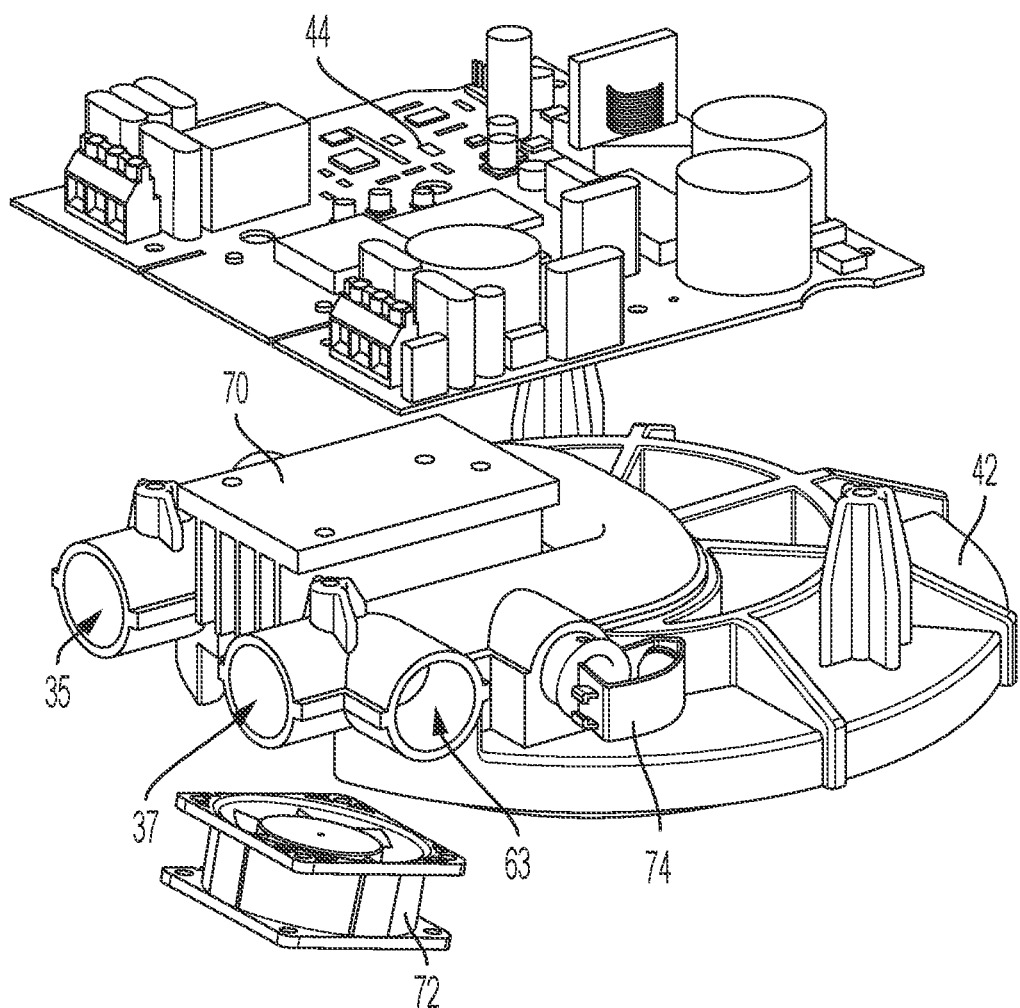
FIG. 11 is a perspective view of a fluid manifold and control circuit used in the system of FIG. 1.
Figure 12:
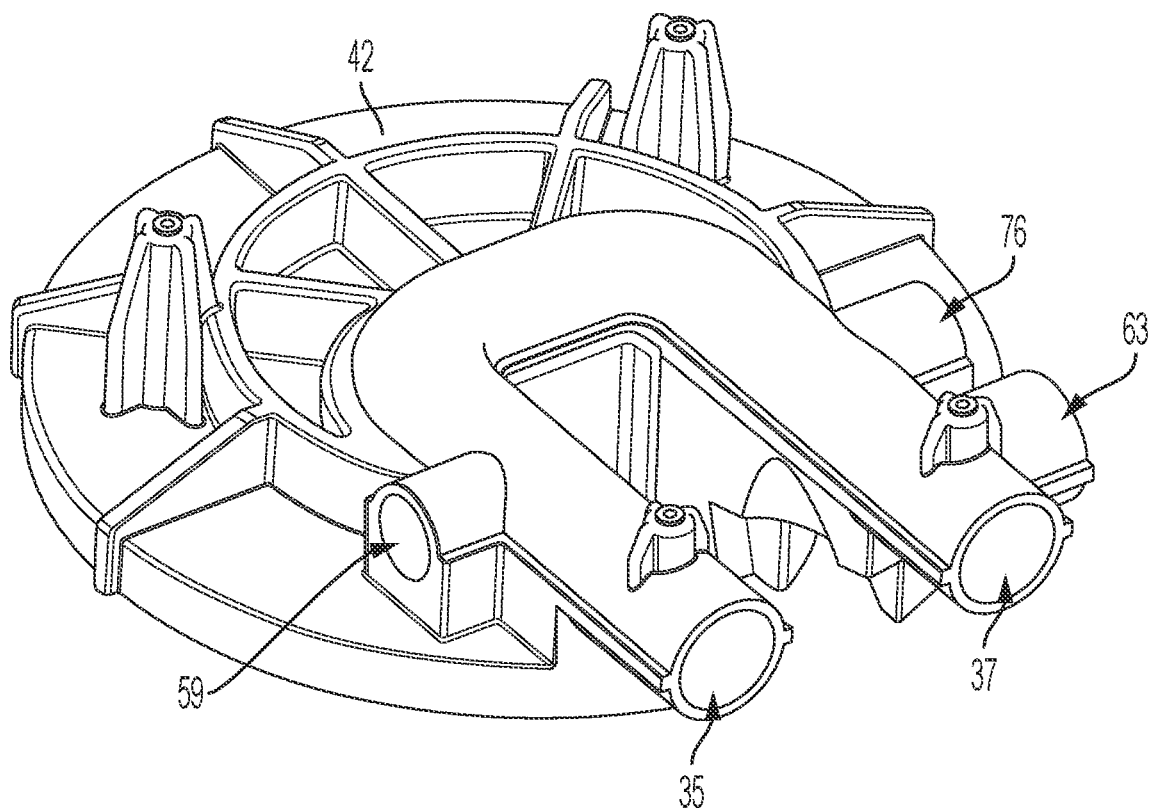
FIG. 12 is a front perspective view of the manifold shown in FIG. 11.
Figure 13:
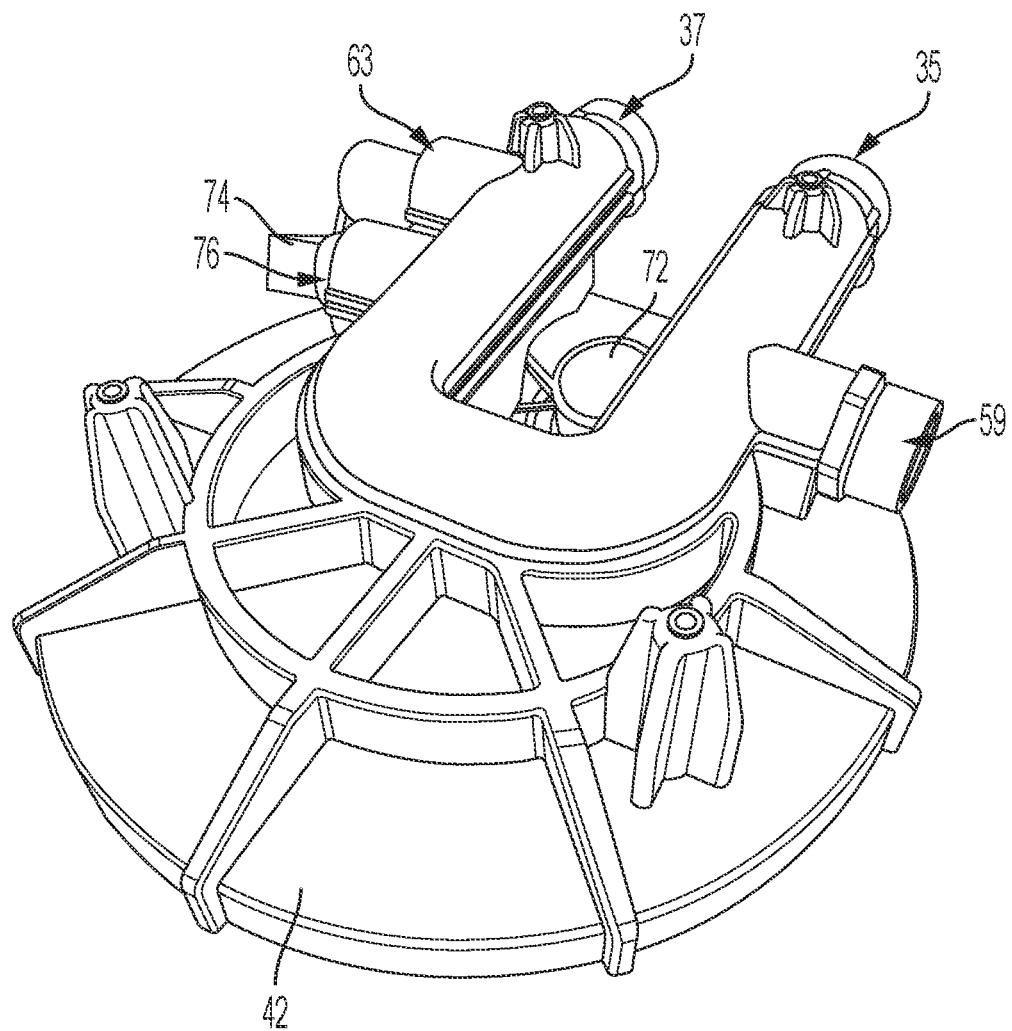
FIG. 13 is a rear perspective view of the manifold shown in FIG. 11, shown with connectors attached.

The arcuate flow channel of manifold 42 may include additional fluid apertures for additional sensor and systems. These include an inlet-pressure transducer aperture 59 designed to receive pressure transducer 58 (FIG. 10), manifold auxiliary outlet 63 designed to fluidly connect to an auxiliary outlet conduit 62 (FIG. 2), and flow meter aperture 76 designed to receive a flow meter 74 (FIG. 11). The functions of these structures are described in turn below.

In an alternative embodiment of manifold 42, the check valve at inlet 35 and the flow meter 74 can be integrated directly in the U-shaped flow path of the manifold 42, rather than appended as separate components outside the flow path. For example, each component may have a male threaded exterior which can be fixed to a female threaded insert which has been molded or otherwise affixed within U-shaped flow path of the manifold 42. In this alternative embodiment, flow meter 74 may be configured to allow flow to pass through meter 74 while being sensed or measured, such as with a hall-effect flow meter.

As shown in FIG. 11, the arcuate flow channel of manifold 42 also defines an area between inlet 35 and outlet 37 sized to receive heat sink 70. Heat sink 70 can be placed adjacent the flow path, as shown, and abuttingly mated to an under-surface of control circuit 44 such that heat generated by control circuit is discharged to heat sink 70. As the temperature of heat sink 70 increases, fluid flows through manifold 42 helps to evacuate the heat from heat sink 70. In addition, a cooling fan 72 may be positioned to direct an air flow across heat sink 70. In the illustrative embodiment of FIG. 19, it can be seen that cooling fan 72 is oriented to draw air through a cooling air inlet 88 in housing 32 (FIG. 8), across the outer surface of tank 40, and into the cooling fins of heat sink 70. In particular, cooling air inlet 88 is positioned on a first side the tank 40, while the heat sink 70 is positioned on a second, opposing side of tank 40. Housing does not include any other openings to the ambient air around housing 32, except for air inlet 88. In this way, activation of fan 72 creates a vacuum within housing 32, inducing a flow of air flow to be drawn around tank 40 and routed to heat sink 70. The air may be cooled with the generally cool water contained in tank 40, increasing the efficiency of heat sink 70.

Optionally, system 30 may include an auxiliary drain outlet 60, which may have a manual valve. Drain outlet 60 is fluidly connected to the outlet 37 of manifold 42 via an auxiliary outlet 63 formed along the flow path (FIG. 11), illustratively having a flow axis perpendicular to the flow axis defined by outlet 37. A conduit 62, shown in FIG. 20, runs through the interior of housing 32 and connects outlet 63 of manifold 42 to drain outlet 60. Drain outlet 60 may be used to relieve pressure within the water system for maintenance, or as a point-of-use water connection to retrieve water directly from system 30 (as opposed to retrieval via downstream plumbing fixtures).

In addition to tank pressure sensor 68 described above, system 30 may include additional sensors which add functions and features in connection with control circuit 44. For pressure monitoring, a water pressure transducer 58 (FIGS. 9 and 10) may be coupled to the flow pathway via pressure transducer aperture 59 of manifold 42 (FIG. 12), near inlet 35 and upstream of pressure tank aperture 41 (FIG. 14). Pressure transducer 58 measures the pressure of water arriving at inlet 35 and is configured to issue a signal indicative of such water pressure to control circuit 44. This signal may be used to infer proper functioning of the well pump and overall adequate water pressure in the water distribution system. For example, if the water pressure measured and reported by water pressure transducer 58 is below a preprogrammed lower threshold, control circuit 44 may issue an error to display 46, or another error code or corrective action, indicating a loss of pressure within the water system 30. If the pressure exceeds a preprogrammed upper threshold, control circuit may issue an error to display 46, deactivate the well pump, and/or issue another error code or corrective action, indicating an excessive pressure within the water system 30. These events may be recorded and stored by control circuit 44, exported to a storage medium, and/or reported via display 46. A low pressure signal may be indicative of a worn or broken impeller, a broken pipe or a leak. A high pressure signal may be indicative of a plugged system or an inlet obstruction. These system faults may also be detectable by monitoring flow, wherein loss of flow may correspond to low water pressure causes such as a worn or broken impeller, a broken pipe or a leak.

FIG. 11 further shows a flow sensor 74 received in flow sensor aperture 76, which is near outlet 37 and downstream of pressure tank aperture 41 (FIG. 14). Flow sensor 74 is configured to measure a speed of flow through outlet 37, and issues a signal indicative of the flow speed and, given a known cross-sectional area of the conduit at outlet 37, the signal is also indicative of a flow rate of water passing through outlet 37. This signal may be used by control circuit 44 to monitor water usage and ensure that desired flow rates are being achieved. For example, water flow rates and reports of overall water usage for a given time interval may be recorded and stored by control circuit 44, exported to a storage medium, and/or reported via display 46.

FIGS. 2, 3, 6 and 18 illustrate upper moisture sensor 54 and lower moisture sensor 56 contained within housing 32. Each moisture sensor 54, 56 is positioned to be contacted by liquid contained within housing 32 if such liquid is allowed to accumulate in the sealed lower portion of the housing 32, and is configured to issue a signal indicative of the presence or absence of moisture in the vicinity of a respective moisture sensor 54, 56. Such a signal may be sent to control circuit 44, which may in turn issue an error alert or other signal indicating a need for remediation or corrective action.

Figure 5:
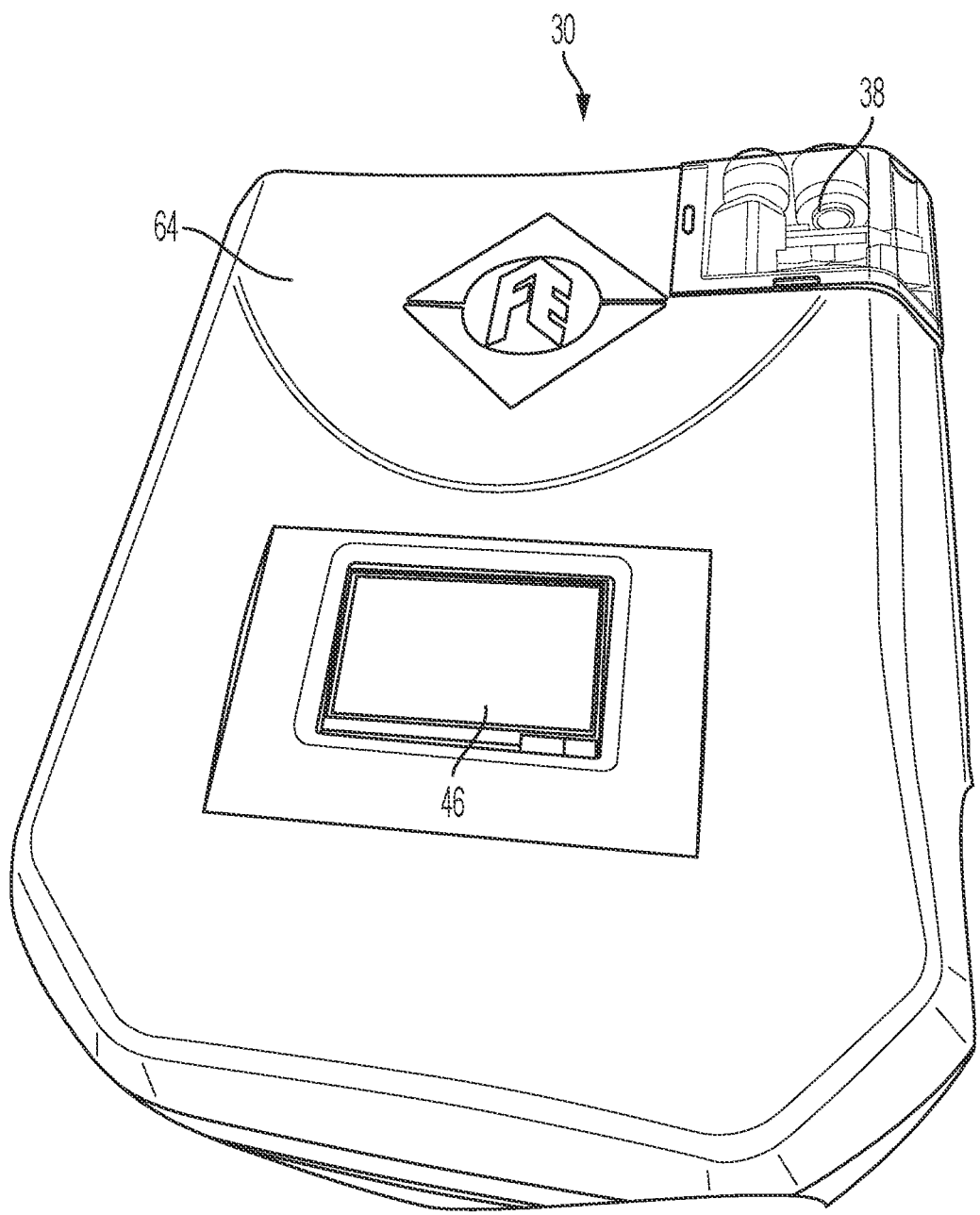
FIG. 5 is a top perspective view of the self-contained well water system of FIG. 3.
Figure 18:
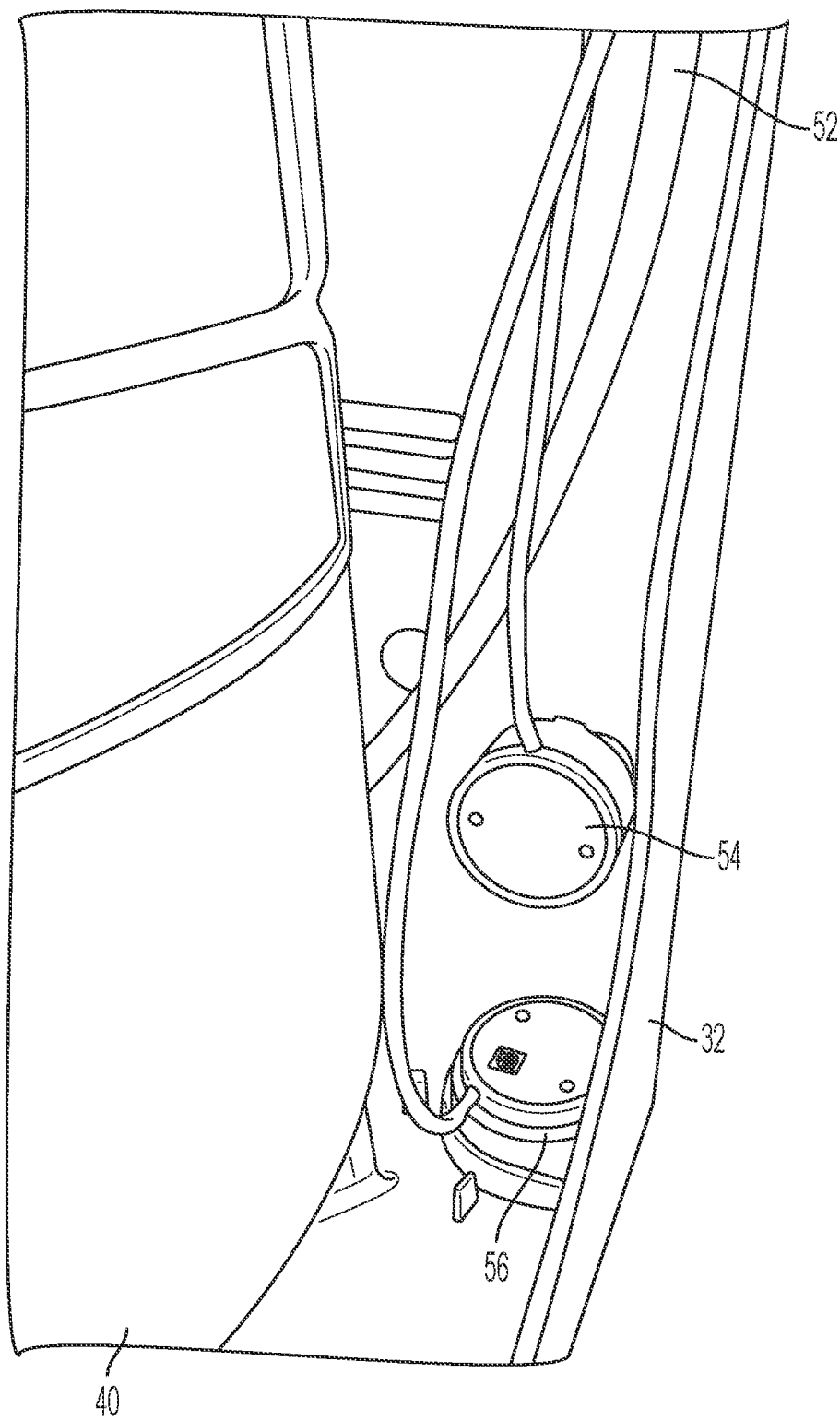
FIG. 18 is a perspective view of an internal portion of the system of FIG. 1, illustrating moisture sensors therein.

As best seen in FIG. 18, the lower moisture sensor 56 is received within a sump portion of the housing 32, disposed adjacent an interior bottom surface thereof. Thus, sensor 56 is positioned to detect even a small amount of water within housing 32 and may issue an early-alert signal indicating that water has begun to accumulate. This early-alert signal may be used by control circuit 44, for example, to create an error message on display 46 (FIG. 5) while allowing system 30 to continue functioning. Such a small amount of water may occur, for example, if relieve valve 48 (FIG. 2) is activated by an over-pressure condition at outlet 36, in which case a small quantity of water is directed to the bottom of housing 32 by relief conduit 50.

By contrast, the upper moisture sensor 54 is positioned above the lower moisture sensor 56 but also spaced below air inlet 88. If the water level within housing 32 reaches the upper sensor 54, an alert signal may issue indicating that a leak or other serious error event is occurring. Control circuit 44 may take additional remedial action, such as deactivating the well pump of the well water system, in order to help ensure that additional water will not accumulate sufficient to leak from housing (e.g., via air inlet 88). In an exemplary embodiment, housing 32 is configured to contain all or substantially all of the water which could possibly leak both before and after such deactivation takes place. For example, housing 32 may be sized to contain the entire contents of pressure tank 40 and the associated connections and conduits within housing 32, in addition to the amount of water needed to reach upper sensor 54. In particular, cooling air inlet 88 may be positioned high enough that the portion of housing 32 below the lowest point of cooling air inlet 88, but above upper sensor 54, defines a volume sufficient to retain all or substantially all (e.g., at least 95%) of the water contained within the various water-containing components positioned inside housing 32. Signals from sensors 54 and/or 56 may be recorded and stored by control circuit 44, exported to a storage medium, and/or reported via display 46.

In an alternative embodiment, one or both of sensors 54, 56 may be replaced with another water-level measuring device, such as a float system. In one such float system, a hollow float ball is configured to float on any water contained within housing 32, and the float ball is connected to a pivoting or sliding arm. The arm may actuate one or more limit switches as the water level within housing 32 rises together with the float ball. In another float system, one or more float switches, wherein a switch is housed within a float ball, may be tethered at positions within housing 32 such that each switch is activated when its associated float rises with the water level within housing 32. Any other suitable water-level measuring device or meters may also be used as required or desired for a particular application.

As noted above, control circuit 44 is operably connected to the junction box, such that control circuit 44 is electrically connected to the set of power wires 84 (FIG. 16) and to the set of pump wires 82. Control circuit 44 is powered by power received from wires 84, and includes a drive, such as a variable-frequency drive, operable to controllably pass power to the well pump of the well system via pump wires 82.

In an exemplary embodiment, control circuit 44 includes a variable-frequency drive (VFD). The VFD may be designed specifically for use with a well pump designed to draw water from depths of more than ten and perhaps dozens of meters below grade, as opposed to a jet pump or any other type of pump which would be adapted for much shallower depths of less than 10 meters. Variable-frequency drive operation delivers superior controllability and efficiency compared to a control system based on a simple on/off pressure switch, though such a pressure switch could be incorporated into system 30 as required or desired for a particular application. However, it is also contemplated that control circuit 44 may exclude a VFD and instead use a set of switches and/or relays operable to provide on/off power to the well pump. Where VFD is excluded, heat sink 70 (FIG. 11) and its associated components, as discussed herein, may also be excluded.

Control circuit 44 receives signals from pressure transducers 58 and 68 (FIG. 9), moisture sensors 54, 56 (FIG. 3), and flow meter 74 (FIG. 11), and is programmed to activate and control the pump of the well system and the cooling fan 72 (FIG. 11). The status of the various sensors may be displayed via display 46 mounted to lid 64 (FIG. 5) by control circuit 44. Control circuit 44 may also report, via display 46, the voltage and incoming current at power wires 84, the status and function of the pump, and any error codes as described herein.

Control circuit 44 may also include a temperature sensor for components of the variable frequency drive or other heat-generating components, and may activate cooling fan 72 when the temperature reaches or exceeds a preprogrammed threshold.

Display 46 may further include user input functionality such as via a touch screen, and connection to an external computer system or the like. This may allow a user to toggle the well pump and/or cooling fan 72 on and off for diagnostics and troubleshooting, for example, or for manual control over the operation of system 30.

Well water system 30 may be used as a retrofit to replace existing site-built, non-self-contained well systems. For example, existing plumbing connections may be removed from the plumbing input, e.g., a trunk line or other service line that serves as a point-of-entry for a plumbing system in a home or business. Existing connections may similarly be removed from an existing well water supply line, e.g., a water line running from a well head to the interior or the structure served by the well. All the intermediate existing well equipment, including a stand-alone pressure tank, stand-alone pressure switches or motor drives, pressure monitoring gauges, and all associated plumbing and electrical connections may be removed and discarded.

At this point, the retrofit may be completed by simply creating a fluid-tight inlet connection from the well water supply line to water inlet 34 of the well water system 30, creating a fluid-tight outlet connection from water outlet 36 of the well water system 30 to the plumbing input, creating an electrical connection from the power supply to the set of power wires 84 of system 30, and creating a pump power connection between the well pump and the set of pump power wires 82 of system 30. Cover 38 may then be placed over the wires 82, 84 and the junction box, and powering on the unit using a power switch or a main-power function programmed into control circuit 44 and activated through display 46.

At this point the installer or homeowner may activate the well pump by, e.g., issuing an activation command through display 46. This may initiate the pumping of water from the well pump to pressure tank 40. This initial pressurization may be monitored and compared by control circuit 44 to an acceptable range or initial pressurization profiles and, to the extent that the actual pressurization is outside of the expected pressurization profile, control circuit 44 may deactivate the well pump and issue an alert via display 46 or take other corrective action. The initial pressurization profile and/or the acceptable range of pressurization profiles may be displayed during the initial pressurization via display 46.

System 30 replaces site-built systems of variable quality and functionality with a self-contained unit using reliably high-quality, factory-built connections and electronics. Because housing 32 contains the connection and electronic systems in a substantially sealed unit, the connections may be protected and monitored as described herein. The electronic components, pressure tank 40 and the other components of system 30 may be matched to one another to ensure smooth functioning and avoid performance bottlenecks. This minimizes failure modes, ensures high performance, and prevents unnecessary service calls and maintenance.

In one embodiment, system 30 may be produced in a factory environment where components are selected, matched and integrated with one another prior to shipment to a customer site. In this method of production, the components of system 30 may be retrieved from a stock of components warehoused on-site. These warehoused stocks of components may include any of the components of system 30 described herein, including housing 32, pressure tank 40, manifold 42, inlet 34, outlet 36, control circuit 44, display 46, and other components shown and described with reference to FIGS. 2-20. The components retrieved from the warehoused stocks of components are chosen to be a functional and spatial match with the other components in order to create a high-performance finished system 30 as described herein. For example, components used to make fluid connections may be selected to functionally match one another, e.g., by selecting components of the same nominal size to avoid reducers or extraneous couplings. The components received within housing 32, such as pressure tank 40 and manifold 42, may be selected to spatially match housing 32. e.g., by selecting components which fit the space interior of the selected housing 32.

The components can then be assembled in the factory environment. This includes installing the pressure tank 40 into housing 32, installing the manifold 42 to pressure tank 40 and within housing 32, installing inlet 34 and outlet 36 to housing 32, and installing all the other components of system 30 into or onto housing 32 as described above. In an exemplary embodiment, manifold 42 is installed to tank 40, then both components (with their respective connections, etc.) are installed within housing 32. As shown in FIGS. 2-20 and described above, tank 40 is installed near the bottom of housing 32.

The locations, supports, and connections of each component can be controlled, verified and tested according to quality control standards. In particular, the fluid-tight connections associated with system 30 can be created with the spatial orientation and resulting connection quality between components to ensure leak-free performance at high-pressure. These fluid connections include those between manifold 42 and the various components connecting to manifold 42, and the connection of pressure tank conduit 86 to tank 40 and tank aperture 41 of manifold 42.

The connections of the fluid connections, and the calibration of the sensors and components associated with control circuit 44, may then be tested, calibrated and verified. For example, a pressure equal to the highest pressure expected in a field delivery, plus a safety margin, may be applied to the fluid-carrying components of system 30 and all such components and connections therebetween may be checked for leaks.

Similarly, the electrical components of system 30 may be calibrated to ensure they are fulfilling their desired function. For example, sensors 54, 56 may be exposed to water to verify appropriate signals being issued to control circuit 44. Pressure transducers, such as transducers 58, 68 shown in FIG. 9 and described above, may be calibrated to ensure the signals issued by transducers 58, 68 in response to known pressures are indicative of such known pressures in the context of the programming of control circuit 44. Generally speaking, control circuit 44 and display 46 may also be checked for proper functioning.

In the factory environment, multiple system 30 may be produced serially using the same method for each one. In this way, efficiencies of scale may be employed to reduce cost. When completed, each system 30 may be securely packaged, prepared for shipment, and shipped to an end-user or intermediary vendor.

Moreover, when system 30 is equipped with a VFD as described above, the use of system 30 promotes the adoption of variable-frequency control over well pumps by ensuring that such systems are properly implemented and integrated, otherwise seen as a challenge for retrofits of site-built well delivery systems. System 30 may include diagnostics and feedback including pressure and flow monitoring. System 30 may be controlled, monitored, and/or upgraded by remote or over-the-air (OTA) diagnostics and functionality currently unavailable to site-built systems.

Figure 21:
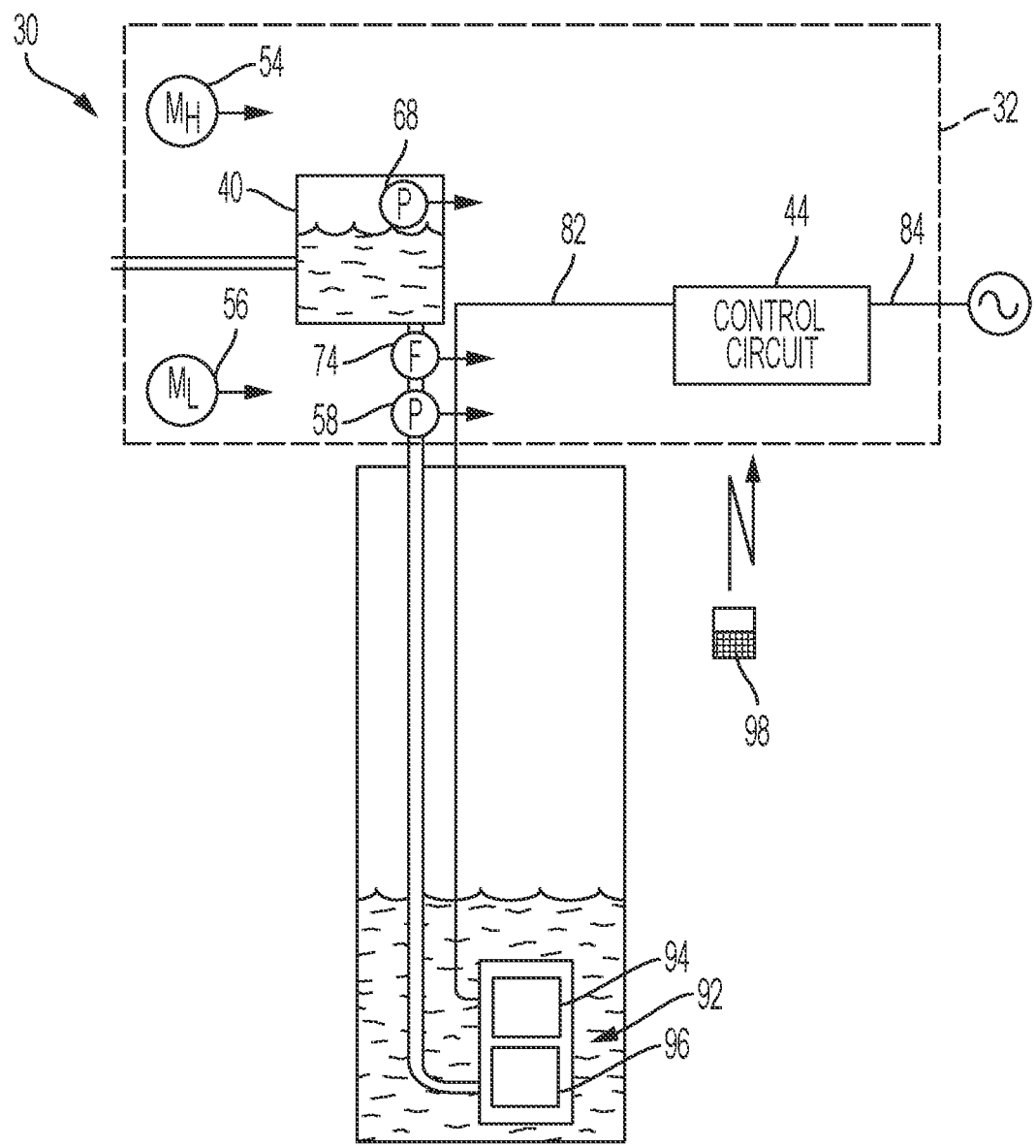
FIG. 21 is a schematic view of a control system and a self-contained well water system made in accordance with the present disclosure.

FIG. 21 illustrates an embodiment of a typical well water system in which well water delivery system 30 may be used. The well water system includes a pump-motor assembly 92 including an electric motor 94 and a pump 96. Pump-motor assembly 92 is shown as a submersible pump used in conjunction with system 30, as illustrated in FIG. 21 and also described in detail above with reference to FIGS. 1-20.

The arrangement of FIG. 21 also includes a wireless device 98. Wireless device 98 may be any device with a user interface capable of communicating wirelessly with control circuit 44, in any manner known in the art, including WiFi and Bluetooth wireless communications. Methods of wirelessly communicating communication parameters and other information between control circuit 44 and wireless device 98 are described in commonly owned U.S. Pat. No. 10,090,878, the entire disclosure of which is incorporated herein by reference.

As indicated above, control circuit 44 may comprise a variable frequency motor drive. An example of a motor drive, denoted by numeral 100, is described with reference to FIG. 22. As shown, motor drive 100 includes a controller 102, a rectifier 120 and an inverter 130. Controller 102 includes a central processing unit (CPU) 104 configured to access a memory device 110 and execute processing instructions from a software application, exemplified by program 112, based on data 114. Suitable techniques for generating motor voltages for control of motor 94, according to characteristics of a command signal, are known in the art. In one example, a technique includes storing values in a table corresponding to samples of an operating curve. The operating curve is typically a substantially straight line defining a volts-hertz relationship. When the control system determines a desired operating speed, which defines an operating frequency, motor drive 100 looks up a voltage corresponding to the frequency. Motor drive 100 then generates a motor voltage based on the voltage and the frequency and supplies this voltage to motor 94. In another example, a formula or a function embodying the operating curve characteristics is used by CPU 104 to generate the desired motor voltages.

Rectifier 120 is powered by a power source and may include any rectification circuit known in the art. e.g. a diode bridge, to convert alternating-current (AC) voltage supplied by the power source into direct-current (DC) voltage which it supplies to inverter 130. Inverter 130 receives DC power from rectifier 120 through a conductor 122 and converts the DC power into an AC motor power for use by motor 94. It should be understood that rectifier 120 may be excluded. In variations of the present embodiment, a DC voltage source provides power to inverter 130. Examples of DC voltage sources include batteries and solar panels.

Figure 22:
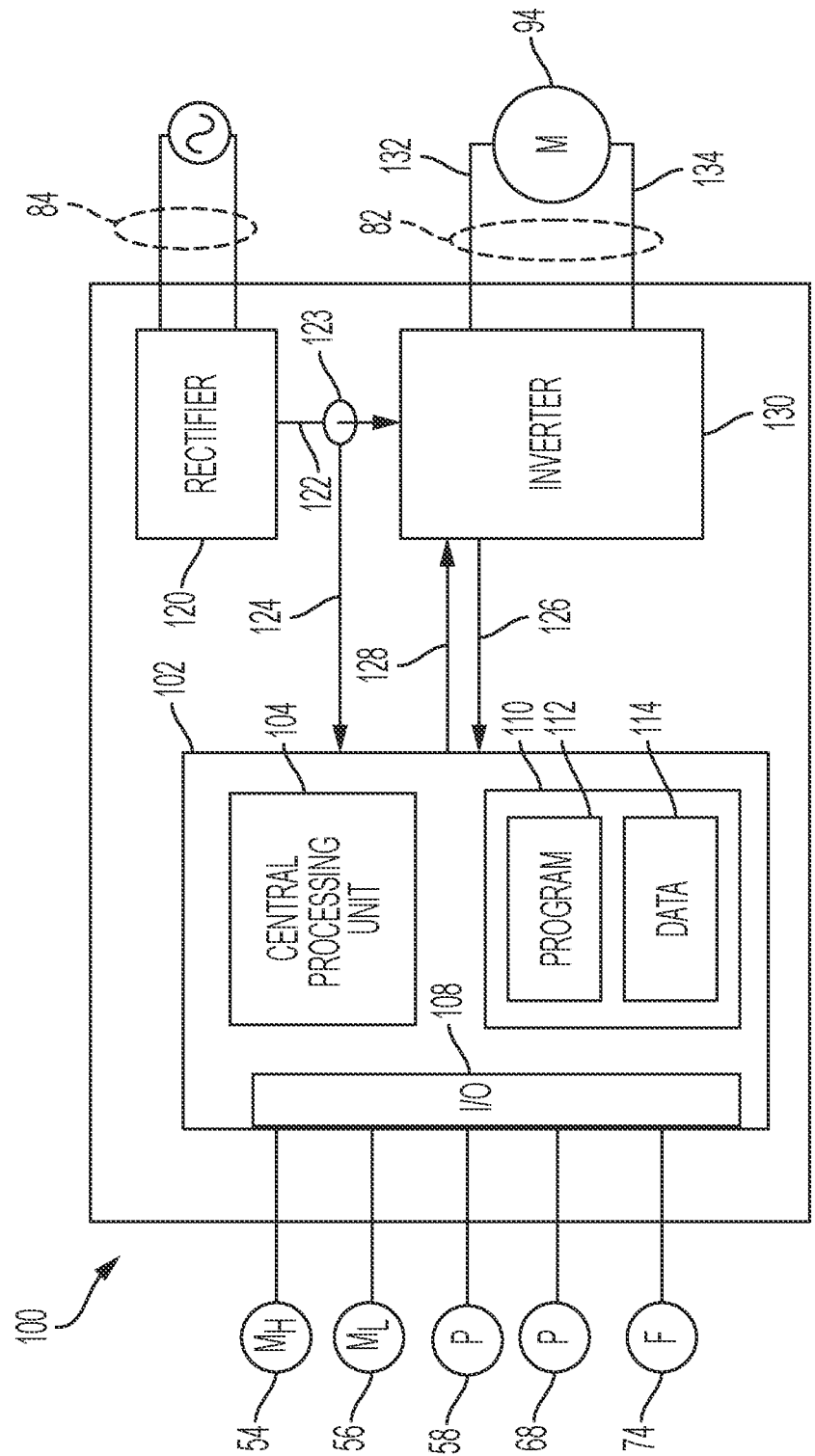
FIG. 22 is another schematic view of a control system for a self-contained well water system made in accordance with the present disclosure.

Referring still to FIG. 22, CPU 104 receives inputs through an I/O) interface 108 and outputs a command signal over line 128 to inverter 130. In one example, the command signal is provided to a pulse width modulated (PWM) module having power switches and switching control logic which generates the appropriate gating signals for the power switches to convert the DC power to the AC motor voltage suitable to drive motor 94, provided to motor 94 via conductors 132, 134. Current drawn by inverter 130 from rectifier 120 is sensed by a current sensor 123 and a current signal is provided by current sensor 123 to CPU 104 by conductor 124. Motor voltage feedback can also be provided, for example through conductor 126 connecting inverter 130 and controller 102. Motor voltages may also be generated with other known or later developed drive topologies programmed in accordance with embodiments of the disclosure.

Figure 23:
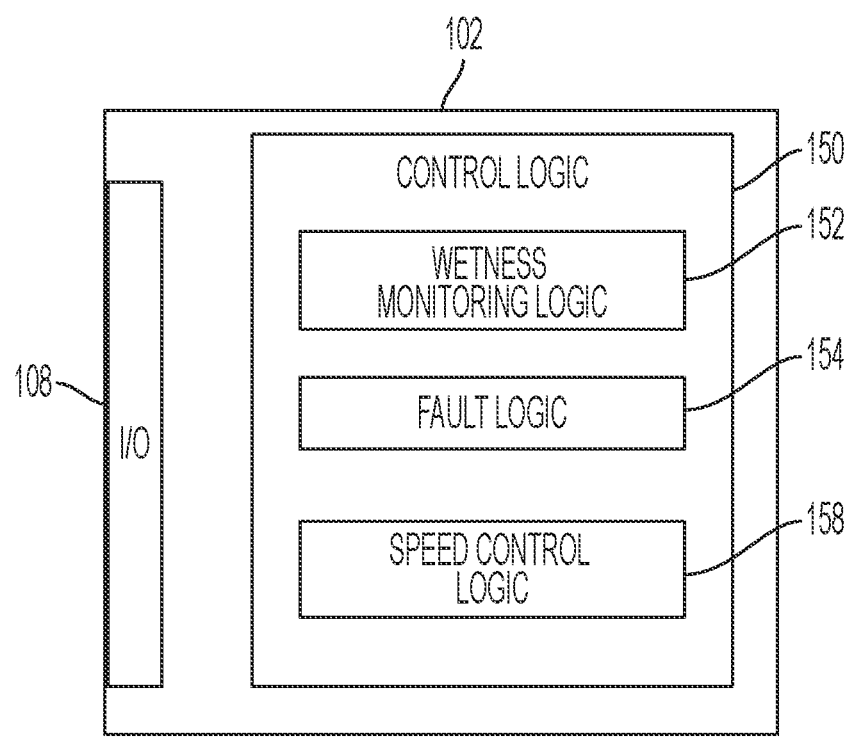
FIG. 23 is a schematic view of a portion of the control system shown in FIG. 22.

Turning to FIG. 23, in a more general embodiment of controller 102 comprises control logic 150 operable to generate the command signal. Control logic 150 may comprise wetness monitoring logic 152, fault logic 154, speed control logic 158, and any other additional or optional logic configured to implement desired functionality. As described herein, wetness monitoring logic 152 may determine the presence or absence of moisture based on a moisture signal received from moisture sensors 54, 56, shown in FIG. 18 and described in detail above, and may be programmed to initiate an alarm and/or remedial action as also described above.

Fault logic 154 may determine, based on flow meter 74 or pressure sensors 58, 68, whether a fault, such as a loss of pressure/flow or high pressure, as described above, has occurred. Speed control logic 158 may output command signals to inverter 130 based on a difference between a process variable, e.g., signals from pressure sensor 68, and a process setpoint or range of setpoints, to control the speed of the motor to maintain the process variable about the process setpoint or within the range or process setpoints.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory computer-readable medium, or memory, may include random access memory (RAM), read-only memory (ROM), erasable programmable read-only memory (e.g., EPROM, EEPROM, or Flash memory), or any other tangible medium capable of storing information.

Pressure sensor 58 outputs a signal corresponding to pressure, as described above. The signal may have a substantially infinite number of values in very small increments, such as an analog signal, which may be digitized before being provided to control circuit 44 in digital form, or may be a binary signal typically associated with pressure switches, such as an on/off signal based on a calibrated pressure switch pressure.

Control circuit 44 may also comprise a contactor operable to engage or disengage the motor based on the pressure, and a circuit including the control logic described above and structured to generate a signal to engage and disengage the contactor and, corresponding to such engagement/disengagement, the submersible motor 94. While such a system is less refined than a system with a variable speed drive, it may be used for system 30 in some circumstances.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A well water system comprising:
    a housing;
    a water inlet mounted to the housing;
    a water outlet mounted to the housing;
    an electrical junction box mounted to the housing, the junction box including a set of power wires configured to receive electrical power from a power source and a set of pump wires configured to send the electrical power to a well pump external of the housing;
    a pressure tank contained within the housing;
    a manifold contained within the housing and having a manifold inlet connected to the water inlet, a manifold outlet connected to the water outlet, and a pressure tank aperture connected to the pressure tank; and
    a control circuit operably connected to the junction box, the control circuit electrically connected to the set of power wires and to the set of pump wires.

2. The well water system of claim 1, wherein the manifold includes an arcuate flow channel extending from the manifold inlet to the manifold outlet, the pressure tank aperture positioned adjacent, and fluidly connected, to the arcuate flow channel.

3. The well water system of claim 2, wherein:
    the manifold inlet defines a longitudinal inlet axis;
    the manifold outlet defines a longitudinal outlet axis substantially parallel to the inlet axis; and
    the pressure tank aperture defines a longitudinal aperture axis substantially perpendicular to the inlet and outlet axes.

4. The well water system of claim 1, wherein the manifold is mounted to an upper, water-containment end of the pressure tank.

5. The well water system of claim 4, further comprising:
    a water pressure sensor operably connected to the water inlet, the water pressure sensor configured to issue a signal indicative of a water pressure at the water inlet to the control circuit; and
    a tank pressure sensor operably connected to a lower, air-containment end of the pressure tank, the tank pressure sensor configured to issue a signal indicative of an air pressure within the pressure tank to the control circuit.

6. The well water system of claim 5, further comprising a flow sensor operably connected to the water outlet, the flow sensor configured to issue a signal indicative of a flow rate of water passing through the water outlet.

7. The well water system of claim 1, further comprising a moisture sensor disposed within the housing, the moisture sensor positioned to be contacted by moisture contained within the housing and configured to issue a signal indicative of a presence or absence of moisture in vicinity of the moisture sensor.

8. The well water system of claim 7, wherein:
    the moisture sensor is a first moisture sensor received within a sump disposed adjacent an interior bottom surface of the housing; and
    the system further comprising a second moisture sensor connected to an interior wall surface of housing above the first moisture sensor.

9. The well water system of claim 1, further comprising:
    a tank pressure sensor operably connected to the pressure tank, the tank pressure sensor configured to issue a signal indicative of a pressure within the pressure tank to the control circuit; and
    a display mounted to the housing and operably connected to the control circuit, the display programmed to display the pressure.

10. The well water system of claim 9, further comprising a moisture sensor disposed within the housing, the moisture sensor positioned to be contacted by moisture contained within the housing and configured to issue a signal indicative of the presence or absence of moisture in the vicinity of the moisture sensor, the display programmed to display the presence or absence of moisture.

11. The well water system of claim 1, wherein the control circuit is located adjacent to the manifold, in a heat-transferring relationship with a flow path extending through the manifold from the water inlet to the water outlet.

12. The well water system of claim 11, further comprising a heat sink disposed adjacent the flow path and abutting the control circuit.

13. The well water system of claim 12, wherein the housing includes a cooling air inlet positioned on a first side of the pressure tank, the system further comprising a cooling fan proximate the heat sink and positioned on a second side of the pressure tank opposite the first side, whereby the cooling fan is configured to draw a flow of air around the pressure tank and direct the flow of air to the heat sink.

14. The well water system of claim 1, further comprising a well pump connected to the set of pump wires, the well pump located external of the housing.

15. The well water system of claim 14, wherein the control circuit includes a variable-frequency drive for the well pump.

16. The well water system of claim 14, wherein the well pump is a submersible well pump.

* * * * *